United States Patent
Unagami et al.

(10) Patent No.: US 11,570,184 B2
(45) Date of Patent: *Jan. 31, 2023

(54) IN-VEHICLE NETWORK SYSTEM, FRAUD-DETECTION ELECTRONIC CONTROL UNIT, AND FRAUD-DETECTION METHOD

(71) Applicant: PANASONIC INTELLECTUAL PROPERTY CORPORATION OF AMERICA, Torrance, CA (US)

(72) Inventors: Yuji Unagami, Osaka (JP); Hideki Matsushima, Tokyo (JP); Tomoyuki Haga, Nara (JP); Manabu Maeda, Osaka (JP); Yoshihiro Ujiie, Osaka (JP); Takeshi Kishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 229 days.

This patent is subject to a terminal disclaimer.

(21) Appl. No.: 17/169,978

(22) Filed: Feb. 8, 2021

(65) Prior Publication Data

US 2021/0185056 A1 Jun. 17, 2021

Related U.S. Application Data

(63) Continuation of application No. 16/540,675, filed on Aug. 14, 2019, now Pat. No. 10,951,631, which is a
(Continued)

(30) Foreign Application Priority Data

Feb. 20, 2015 (JP) .................................. 2015-032200

(51) Int. Cl.
*H04L 29/06* (2006.01)
*H04L 9/40* (2022.01)
(Continued)

(52) U.S. Cl.
CPC ............ *H04L 63/14* (2013.01); *B60R 16/023* (2013.01); *G06F 21/577* (2013.01);
(Continued)

(58) Field of Classification Search
CPC ......... H04L 63/14; H04L 12/28; H04L 67/12; H04L 63/20; H04W 4/40; B60R 16/023;
(Continued)

(56) References Cited

U.S. PATENT DOCUMENTS 7,046,638 B1  5/2006 Klausner et al.
9,419,802 B2 * 8/2016 Lortz .................... H04L 9/3247
(Continued)

FOREIGN PATENT DOCUMENTS

CN  1881923   12/2006
EP  1734693   12/2006
(Continued)

OTHER PUBLICATIONS

Davis,"Controller Area Network (CAN) schedulability analysis: Refuted, revisited and revised", 2007, Springer Science, pp. 239-272 (Year: 2007).*
(Continued)

*Primary Examiner* — Taghi T Arani
*Assistant Examiner* — Gregory A Lane
(74) *Attorney, Agent, or Firm* — Greenblum & Bernstein, P.L.C.

(57) ABSTRACT

In a fraud-detection method for use in an in-vehicle network system including a plurality of electronic control units (ECUs) that exchange messages on a plurality of networks, a plurality of fraud-detection ECUs each connected to a different one of the networks, and a gateway device, a fraud-detection ECU determines whether a message transmitted on a network connected to the fraud-detection ECU is malicious by using rule information stored in a memory.
(Continued)

The gateway device receives updated rule information transmitted to a first network among the networks, selects a second network different from the first network, and transfers the updated rule information only to the second network. A fraud-detection ECU connected to the second network acquires the updated rule information and updates the rule information stored therein by using the updated rule information.

6 Claims, 22 Drawing Sheets

Related U.S. Application Data continuation of application No. 15/285,706, filed on Oct. 5, 2016, now Pat. No. 10,432,645, which is a continuation of application No. PCT/JP2015/002001, filed on Apr. 9, 2015.

(60) Provisional application No. 61/980,807, filed on Apr. 17, 2014.

(51) Int. Cl.
| | |
|---|---|
| *H04W 4/40* | (2018.01) |
| *B60R 16/023* | (2006.01) |
| *G06F 21/57* | (2013.01) |
| *G06F 21/60* | (2013.01) |
| *G06F 21/71* | (2013.01) |
| *G06F 21/85* | (2013.01) |
| *H04L 12/28* | (2006.01) |
| *H04L 67/12* | (2022.01) |

(52) U.S. Cl.
CPC ............ *G06F 21/606* (2013.01); *G06F 21/71* (2013.01); *G06F 21/85* (2013.01); *H04L 12/28* (2013.01); *H04L 67/12* (2013.01); *H04W 4/40* (2018.02); *G06F 2221/2101* (2013.01); *H04L 63/20* (2013.01)

(58) Field of Classification Search
CPC ...... G06F 21/577; G06F 21/606; G06F 21/71; G06F 21/85; G06F 2221/2101
USPC .......................................................... 726/1
See application file for complete search history.

(56) References Cited

U.S. PATENT DOCUMENTS

| | | |
|---|---|---|
| 2006/0287784 A1 | 12/2006 | Kanki |
| 2010/0329272 A1 | 12/2010 | Tsuboi et al. |
| 2011/0320089 A1 | 12/2011 | Lewis |
| 2013/0091213 A1 | 4/2013 | Diab et al. |
| 2013/0104186 A1 | 4/2013 | Dietz et al. |
| 2014/0114497 A1 | 4/2014 | Miyake |
| 2014/0328352 A1 | 11/2014 | Mabuchi et al. |
| 2015/0066239 A1 | 3/2015 | Mabuchi |
| 2017/0026386 A1 | 1/2017 | Unagami et al. |
| 2017/0147812 A1 | 5/2017 | Ujiie et al. |

FOREIGN PATENT DOCUMENTS

| | | |
|---|---|---|
| EP | 2797263 | 10/2014 |
| JP | 2007-038904 | 2/2007 |
| JP | 2009-194733 | 8/2009 |
| JP | 2010-245794 | 10/2010 |
| JP | 2013-131907 | 7/2013 |
| JP | 2013-141948 | 7/2013 |
| WO | 2013/094072 | 6/2013 |

OTHER PUBLICATIONS

International Search Report of PCT application No. PCT/JP2015/002001 dated Jun. 30, 2015.
Dennis K. Nilsson et al., "Efficient In-Vehicle Delayed Data Authentication Based on Compound Message Authentication Codes" IEEE Vehicular Technology Conference, Sep. 2008.
CAN Specification 2.0, Sep. 1991, [online], CAN in Automation(CiA), [searched on Nov. 14, 2014], Internet<URL: http://www.can-cia.org/fileadmin/cia/specitications/CAN20A.pdf>.
H. Krawczyk et al., "HMAC: Keyed-Hashing for Message Authentication", Network Working Group, RFC2104, Feb. 1997.
The Extended European Search Report dated Mar. 9, 2017 for European Patent Application No. 15779696.2.
English Translation of Chinese Search Report from the Patent Office of the Peoples Republic of China dated Dec. 6, 2018 for the related Chinese Patent Application No. 201580014307.X.
Loukas, "A taxonomy and survey of cyber-physical intrusion detection approaches for vehicles", Oct. 2018, Elsevier, pp. 124-147 (Year: 2018).
Davis, "Controller Area Network(CAN) schedulability analysis: Refuted, revisited and revised", 2007, Real-Time Systems, pp. 239-272 (Year: 2007).

* cited by examiner

FIG. 3
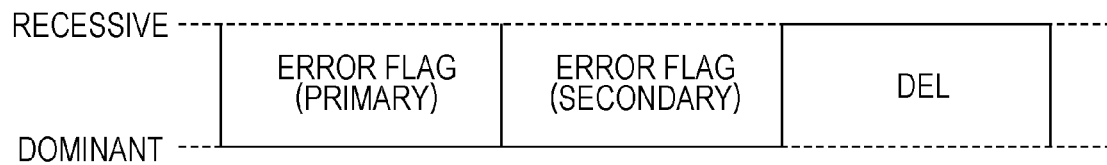
FIG. 4
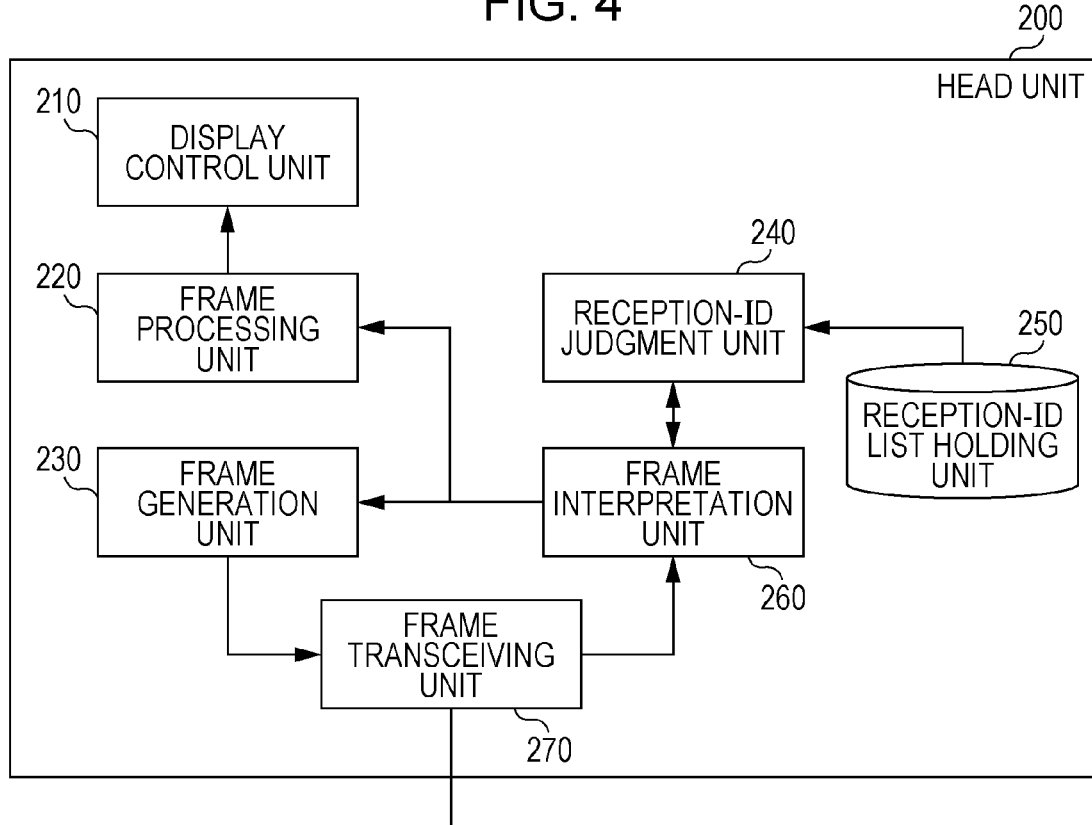
FIG. 5
| RECEPTION-ID LIST |
|---|
| 1 |
| 2 |
| 3 |
| 4 |

| TRANSFER SOURCE | TRANSFER DESTINATION | ID |
|---|---|---|
| 500a | 500b | * |
| 500a | 500c | * |
| 500b | 500a | 3 |
| 500b | 500c | * |
| 500c | 500a | – |
| 500c | 500b | – |

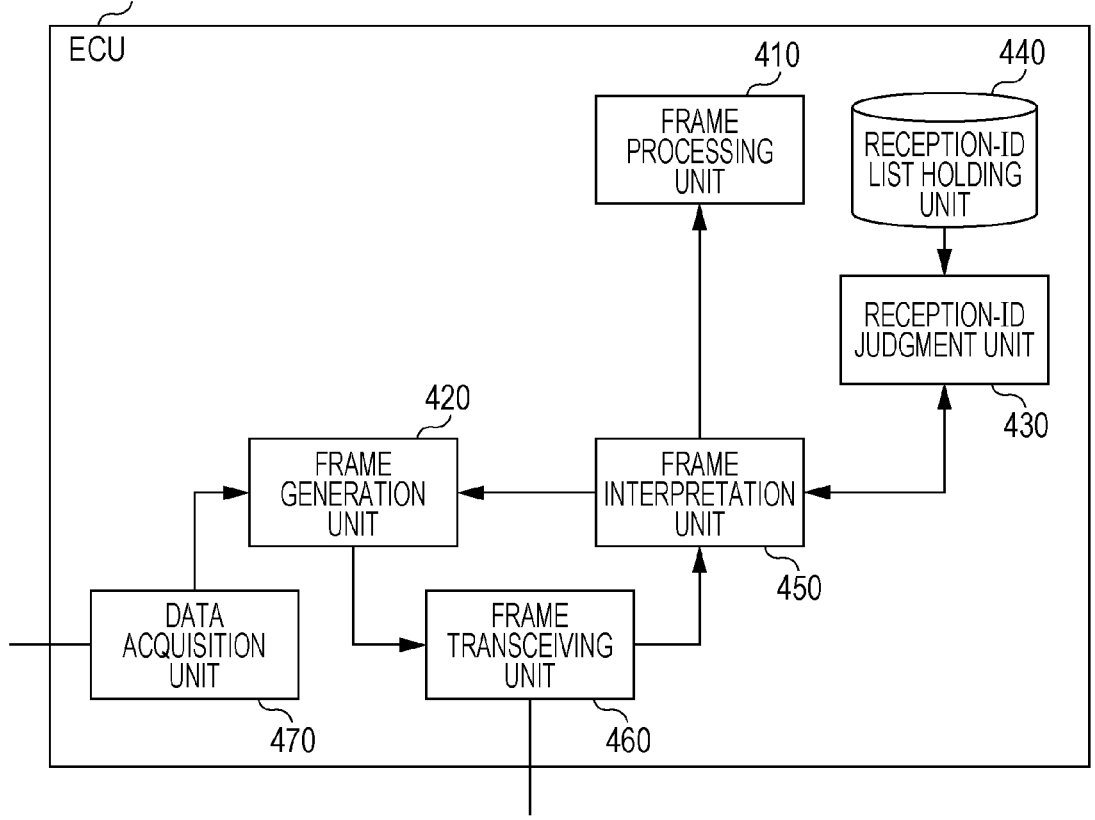

FIG. 11

| ID | DATA |
|---|---|
| 2 | 100 |
| 2 | 90 |
| 2 | 80 |
| 2 | 70 |
| 2 | 60 |
| ... | ... |

FIG. 12

| ID | DATA |
|---|---|
| 3 | 1 |
| 3 | 1 |
| 3 | 0 |
| 3 | 0 |
| 3 | 0 |
| ... | ... |

FIG. 13

| ID | DATA |
|---|---|
| 4 | 0 |
| 4 | 10 |
| 4 | 20 |
| 4 | 30 |
| 4 | 40 |
| ... | ... |

FIG. 17

| ID | FRAUD-DETECTION COUNTER |
|---|---|
| 1 | 0 |
| 2 | 0 |
| 3 | 0 |
| 4 | 1 |
| 5 | 0 |
| ... | ... |

| ID | TRANSMISSION CYCLE (msec) |
|---|---|
| 5 | 20 TO 30 |

| ID FIELD | DATA FIELD |
|---|---|
| 2047 | ID OF MALICIOUS FRAME |

TRANSFER RULES

| TRANSFER SOURCE | TRANSFER DESTINATION | ID |
|---|---|---|
| 500b | 500d | * |
| 500d | 500b | 5, 2047 |

FIG. 24

| ID | DATA |
|---|---|
| 5 | 0 |
| 5 | 0 |
| 5 | 1 |
| 5 | 1 |
| 5 | 1 |
| ... | ... |

FIG. 25

| RECEPTION-ID LIST |
|---|
| 5 |
| 2047 |

FIG. 30

| ID FIELD | DATA FIELD ||
|---|---|---|
| 2046 | ID OF MALICIOUS FRAME | MAC |

FIG. 32

| RECEPTION-ID LIST |
|---|
| 1 |
| 2 |
| 3 |
| 4 |
| 5 |
| 2046 |

FIG. 33

| TRANSFER SOURCE | TRANSFER DESTINATION | ID |
|---|---|---|
| 500b | 500d | * |
| 500d | 500b | 5, 2046 |

IN-VEHICLE NETWORK SYSTEM, FRAUD-DETECTION ELECTRONIC CONTROL UNIT, AND FRAUD-DETECTION METHOD

CROSS-REFERENCE TO RELATED APPLICATION

This is a continuation of U.S. patent application Ser. No. 16/540,675, filed Aug. 14, 2019, which is a continuation of U.S. patent application Ser. No. 15/285,706, filed Oct. 5, 2016 and now U.S. Pat. No. 10,432,645 issued Oct. 1, 2019, which is a continuation of Int. Pat. Appl. No. PCT/JP2015/002001, filed Apr. 9, 2015, which claims the benefit of U.S. Provisional Pat. Appl. No. 61/980,807, filed Apr. 17, 2014, and priority to Jap. Pat. Appl. No. 2015-032200, filed Feb. 20, 2015. The disclosures of these documents, including the specifications, drawings, and claims, are incorporated herein by reference in their entireties.

BACKGROUND

1. Technical Field

The present disclosure relates to a technique for detecting a malicious frame transmitted within an in-vehicle network over which electronic control units perform communication.

2. Description of the Related Art

Systems in recent automobiles accommodate multiple devices called electronic control units (ECUs). A network connecting these ECUs is called an in-vehicle network. There exist multiple standards for the in-vehicle network. Among these standards, a standard called CAN (Controller Area Network) specified in ISO 11898-1 is one of the most mainstream in-vehicle network standards (see "CAN Specification 2.0 Part A", [online], CAN in Automation (CiA), [searched Nov. 14, 2014], the Internet (URL: http://www.can-cia.org/fileadmin/cia/specifications/CAN20A.pdf)).

In CAN, each communication path (bus) is constituted by two cables (lines), and ECUs connected to the bus are referred to as nodes. Each node connected to a bus transmits and receives a message called a frame. A transmitting node that is to transmit a frame applies a voltage to two cables to generate a potential difference between the cables, thereby transmitting the value "1" called recessive and the value "0" called dominant. When a plurality of transmitting nodes transmit recessive and dominant values at completely the same timing, the dominant value is prioritized and transmitted. A receiving node transmits a frame called an error frame if the format of a received frame is anomalous. In an error frame, 6 consecutive dominant bits are transmitted to notify the transmitting nodes or any other receiving node of frame anomaly.

In CAN, furthermore, there is no identifier that designates a transmission destination or a transmission source. A transmitting node transmits frames each assigned an ID called a message ID (that is, sends signals to a bus), and each receiving node receives only a predetermined message ID (that is, reads a signal from the bus). In addition, the CSMA/CA (Carrier Sense Multiple Access/Collision Avoidance) scheme is adopted, and arbitration based on message IDs is performed for simultaneous transmission of a plurality of nodes so that a frame having a message ID whose value is small is preferentially transmitted.

Conventionally, there is also known a technique in which, in a case where a message that is anomalous is transmitted on a CAN bus, a gateway device detects the anomalous message and does not transfer the anomalous message to any other bus to suppress an increase in the load on buses (see Japanese Unexamined Patent Application Publication No. 2007-38904).

A connection of a malicious node to a bus in an in-vehicle network and a malicious transmission of a frame (message) from the malicious node can possibly cause malicious control of the vehicle body. To suppress such a possibility, there is a need for detection of a malicious message.

SUMMARY

One non-limiting and exemplary embodiment provides a fraud-detection electronic control unit (fraud-detection ECU) for detecting that a malicious message has been transmitted on a bus in an in-vehicle network system in which communication is performed in accordance with the CAN protocol or the like. The present disclosure further provides a fraud-detection method for detecting a malicious message, and an in-vehicle network system including a fraud-detection ECU.

In one general aspect, the techniques disclosed here feature a fraud-detection method for use in an in-vehicle network system, the in-vehicle network system including a plurality of electronic controllers that exchange messages through communication via a plurality of buses, a plurality of fraud-detection electronic controllers, each connected to a different one of the plurality of buses, and a gateway device. The fraud-detection method includes determining, by one of the plurality of fraud-detection electronic controllers, whether or not a message transmitted on a bus connected to the one of the plurality of fraud-detection electronic controllers is malicious by using rule information indicating a rule regarding transmission of the message on the bus, wherein the rule is stored in a memory included in the one of the plurality of fraud-detection electronic controllers; transmitting, by the one of the plurality of fraud-detection electronic controllers, in a case where the message is determined to be malicious, an error message including a first message identifier of the message determined to be malicious; receiving, by the gateway device, updated rule information transmitted to a first bus included in the plurality of buses; selecting, by the gateway device, a second bus from among the plurality of buses, except for the first bus, as a transfer destination bus in accordance with a second message identifier to which an updated rule indicated by the updated rule information is to be applied; transferring, by the gateway device, the updated rule information only to the second bus; and acquiring, by a fraud-detection electronic controller connected to the second bus among the plurality of fraud-detection electronic controllers, the updated rule information transferred by the gateway device and updating, by the fraud-detection electronic controller connected to the second bus, the rule information stored in a memory by using the updated rule information.

According to an aspect of the present disclosure, rule information serving as a standard on which the judgment of a malicious frame is based can be defined and updated, making it possible to detect a transmission of a malicious message when a malicious node is connected to a bus within an in-vehicle network system and a malicious message is transmitted.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram illustrating the format of an error frame specified in the CAN protocol;

FIG. 4 is a configuration diagram of a head unit;

FIG. 5 is a diagram illustrating an example of a reception-ID list;

FIG. 8 is a configuration diagram of an ECU according to the first embodiment;

FIG. 9 is a diagram illustrating an example of a reception-ID list;

FIG. 10 is a diagram illustrating an example of IDs and data fields in frames transmitted from an ECU connected to an engine;

FIG. 11 is a diagram illustrating an example of ID and data fields in frames transmitted from an ECU connected to brakes;

FIG. 12 is a diagram illustrating an example of ID and data fields in frames transmitted from an ECU connected to a door open/close sensor;

FIG. 13 is a diagram illustrating an example of IDs and data fields in frames transmitted from an ECU connected to a window open/close sensor;

FIG. 17 is a diagram illustrating an example of the states of fraud-detection counters for individual message IDs;

FIG. 24 is a diagram illustrating an example of ID and data fields in frames transmitted from an ECU connected to a corner sensor;

FIG. 25 is a diagram illustrating an example of a reception-ID list;

FIG. 30 is a diagram illustrating an example of the configuration of an error message;

FIG. 32 is a diagram illustrating an example of a reception-ID list;

FIG. 33 is a diagram illustrating an example of transfer rules;

DETAILED DESCRIPTION

Figure 1:
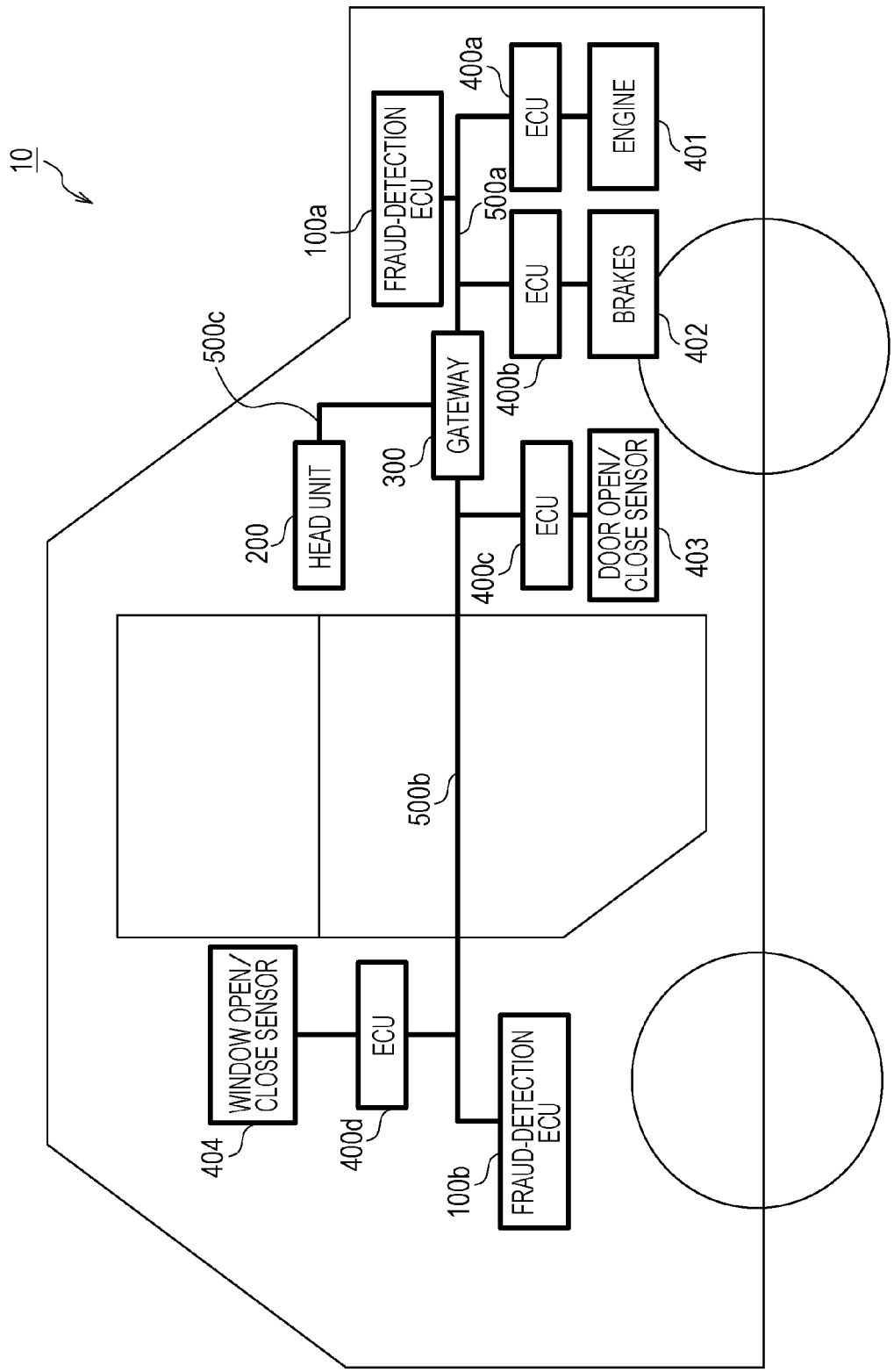
FIG. 1 is a diagram illustrating an overall configuration of an in-vehicle network system according to a first embodiment.

A fraud-detection method for use in an in-vehicle network system, the in-vehicle network system including a plurality of electronic controllers that exchange messages through communication via a plurality of buses, a plurality of fraud-detection electronic controllers, each connected to a different one of the plurality of buses, and a gateway device. The fraud-detection method includes determining, by one of the plurality of fraud-detection electronic controllers, whether or not a message transmitted on a bus connected to the one of the plurality of fraud-detection electronic controllers is malicious by using rule information indicating a rule regarding transmission of the message on the bus, wherein the rule is stored in a memory included in the one of the plurality of fraud-detection electronic controllers; transmitting, by the one of the plurality of fraud-detection electronic controllers, in a case where the message is determined to be malicious, an error message including a first message identifier of the message determined to be malicious; receiving, by the gateway device, updated rule information transmitted to a first bus included in the plurality of buses; selecting, by the gateway device, a second bus from among the plurality of buses, except for the first bus, as a transfer destination bus in accordance with a second message identifier to which an updated rule indicated by the updated rule information is to be applied; transferring, by the gateway device, the updated rule information only to the second bus; and acquiring, by a fraud-detection electronic controller connected to the second bus among the plurality of fraud-detection electronic controllers, the updated rule information transferred by the gateway device and updating, by the fraud-detection electronic controller connected to the second bus, the rule information stored in a memory by using the updated rule information. Examples of the rule information include information related to the transmission interval (for example, information indicating the acceptable range for the transmission cycle, the number of transmissions per unit time, or the like) on a message to be repeatedly transmitted. Thus, rule information serving as a standard on which the judgment of a malicious frame is based can be defined and updated, making it possible to detect a transmission of a malicious message when a malicious node is connected to a bus within an in-vehicle network system and a malicious message is transmitted. In addition, in a case where an in-vehicle network system is configured such that a fraud-detection ECU is connected to each of a plurality of buses, each fraud-detection ECU can updated rule information merely by providing the in-vehicle network system with at least one device capable of communicating with an external device. It is also possible for each device that is included in an in-vehicle network system and that has received an error message to take measures against fraud (such as displaying a warning or not processing a malicious message).

In addition, the plurality of electronic controllers may perform communication via the plurality of buses in accordance with a Controller Area Network (CAN) protocol. This enables a fraud-detection ECU to detect fraud in a case where a malicious electronic control unit (ECU) is connected to an in-vehicle network system in which communication is performed in accordance with the CAN protocol and a malicious frame is transmitted.

In addition, the in-vehicle network system may further include an external communication electronic controller, and the updated rule information may be received by the gateway device in response to a receipt of the updated rule information by the external communication electronic controller from an external device, the updated rule information being transmitted on the first bus by the external communication electronic controller. Thus, rule information for detecting a malicious frame can be appropriately updated even if a device in an in-vehicle network system that communicates with an external device and a fraud-detection ECU have separate configurations.

In addition, the external communication electronic controller may generate a message authentication code for the updated rule information and transmit the updated rule information with the message authentication code added to the updated rule information. This prevents rule information from being updated on the basis of malicious updated rule information.

In addition, the fraud-detection method may further include receiving, by the external communication electronic controller, the error message including the first message identifier of the message determined to be malicious, the error message being transmitted from the one of the plurality of fraud-detection electronic controllers, and transmitting, by the external communication electronic controller, information including the first message identifier to the external device. This enables an external device to collect information concerning a malicious frame (message) detected within an in-vehicle network system. Thus, the external device can manage the status of the n-vehicle network system.

In addition, each of the plurality of fraud-detection electronic controllers may store, in a memory, rule information that associates a message identifier of a message to be transmitted on a corresponding one of the plurality of buses with a rule regarding transmission of the message. Thus, each fraud-detection ECU can detect a malicious frame (message) transmitted on a bus connected thereto.

In addition, each of the plurality of fraud-detection electronic controllers may store, in a memory, rule information that associates, for each of at least one message to be repeatedly transmitted on a corresponding one of the plurality of buses, a message identifier of the message with a rule regarding a transmission cycle or a number of transmissions per predetermined unit time, and each of the plurality of fraud-detection electronic controllers may determine that a message transmitted on the corresponding one of the plurality of buses is malicious in a case where the message does not comply with a rule indicated by the rule information stored in the memory. This makes it possible to detect fraud in a case where a message having a message identifier (message ID) that is identical to that of a periodically transmitted message has been maliciously transmitted from a malicious ECU. For example, message transmission in anomalous transmission cycles, such as a replay attack, can be detected.

In addition, the fraud-detection method may further include transmitting, by one of the plurality of fraud-detection electronic controllers, a message identifier of the message transmitted on the corresponding one of the plurality of buses to a specific electronic controller among the plurality of electronic controllers in a case where the message identifier is not included in the rule information stored in the memory. This enables a fraud-detection ECU to request a specific ECU (such as a head unit) to make a judgment about a message for which a judgment of whether or not fraud is present is difficult to make.

In addition, in the case where the message identifier is not included in the rule information stored in the memory, the message identifier and a measurement result of a transmission cycle of the message may be transmitted to the specific electronic controller, and the specific electronic controller may receive and use the message identifier and the measurement result of the transmission cycle or the number of transmissions per predetermined unit time to determine whether or not the message identified by the message identifier has been maliciously transmitted. This enables a fraud-detection ECU to measure the transmission cycle of a message and then request a specific ECU to judge whether or not the message is malicious.

In addition, the one of the plurality of fraud-detection electronic controllers may measure the transmission cycle or the number of transmissions per predetermined unit time for messages identified by the message identifier, except for a message determined by the specific electronic controller to have been maliciously transmitted.

In addition, in the case where the message identifier is not included in the rule information stored in the memory, the message identifier and a measurement result of the number of transmissions of the message per predetermined unit time may be transmitted to the specific electronic controller, and the specific electronic controller may receive and use the message identifier and the measurement result of the number of transmissions to determine whether or not the message identified by the message identifier has been maliciously transmitted. This enables the fraud-detection ECU to measure the number of transmissions of a message and then request a specific ECU to judge whether or not the message is malicious.

In addition, the updated rule information may be a set of rules for a message having one or more specific message identifiers, and the gateway device may select, as the transfer destination bus, the second bus along which the one or more specific message identifiers flow.

Furthermore, an in-vehicle network system according to another aspect of the present disclosure is an in-vehicle network system including a plurality of electronic controllers that exchange messages through communication via a plurality of buses, a plurality of fraud-detection electronic controllers, each connected to a different one of the plurality of buses, and a gateway device. Each fraud-detection electronic controller of the plurality of fraud-detection electronic controllers includes a memory that stores rule information regarding transmission of at least one message on a bus connected to the fraud-detection electronic controller, and circuitry which, in operation, performs operations including determining whether or not a message transmitted on the bus is malicious by using the rule information stored in the memory; transmitting, in a case where the message is determined to be malicious, an error message including a first message identifier of the message determined to be malicious; acquiring updated rule information transferred from the gateway device; and updating the rule information stored in the memory by using the updated rule information. The gateway device includes one or more memories and circuitry which, in operation, performs operations including receiving the updated rule information transmitted on a first bus included in the plurality of buses; selecting a second bus from among the plurality of buses, except for the first bus, as a transfer destination bus in accordance with a second message identifier to which an updated rule indicated by the updated rule information is to be applied; and transferring the updated rule information only to the second bus. Thus, rule information serving as a standard on which the judgment of a malicious frame is based can be defined and updated, making it possible to detect a transmission of a malicious message when a malicious node is connected to a bus within an in-vehicle network system and a malicious message is transmitted.

A gateway device according to still another aspect of the present disclosure is a gateway device for transferring a message among a plurality of buses. The gateway device includes one or more memories and circuitry which, in operation, performs operations including receiving updated rule information from a first bus included in the plurality of buses; selecting a second bus from among the plurality of buses, except for the first bus, as a transfer destination bus in accordance with a message identifier to which an updated rule indicated by the updated rule information is to be applied; and transferring the updated rule information only to the second bus.

In addition, the updated rule information may be a set of rules for a message having one or more specific message identifiers, and the circuitry may select, as the transfer destination bus, the second bus along which the one or more specific message identifiers flow.

It should be noted that these general or specific aspects may be implemented as a system, a method, an integrated circuit, a computer program, or a computer-readable recording medium such as a CD-ROM, or may be implemented as any combination of the system, the method, the integrated circuit, the computer program, or the recording medium.

In the following, an in-vehicle network system, a fraud-detection ECU, and the like according to embodiments will be described with reference to the drawings. Each of the embodiments described below shows a specific example of the present disclosure. Thus, the numerical values, shapes, materials, constituent elements, the arrangement and connection of the constituent elements, steps (processes), the order of the steps, etc. illustrated in the following embodiments are mere examples, and do not limit the scope of the present disclosure. Among the constituent elements in the following embodiments, constituent elements not recited in any one of the independent claims are constituent elements that can be optionally added. In addition, the drawings are schematic and not representative of exact proportions or dimensions.

First Embodiment

An embodiment of the present disclosure will now be described with reference to the drawings in the context of an in-vehicle network system 10 including a fraud-detection ECU that implements an anti-fraud method for preventing a process based on a malicious frame from being executed on any other node (ECU) by using a message ID.

1.1 Overall Configuration of in-Vehicle Network System 10

FIG. 1 is a diagram illustrating an overall configuration of an in-vehicle network system 10 according to a first embodiment. The in-vehicle network system 10 is an example of a network communication system in which communication is performed in accordance with the CAN protocol, and is a network communication system in an automobile provided with various devices such as a control device and a sensor. The in-vehicle network system 10 is configured to include buses 500*a* to 500*c*, fraud-detection ECUs 100*a* and 100*b*, a head unit 200, a gateway 300, and nodes connected to the buses, called ECUs, such as ECUs 400*a* to 400*d* connected to various devices. While the in-vehicle network system 10 may include numerous ECUs in addition to the ECUs 400*a* to 400*d*, which are not illustrated in FIG. 1, the description will be given here focusing on the ECUs 400*a* to 400*d*, for convenience. Each ECU is a device including, for example, digital circuits such as a processor (microprocessor) and a memory, analog circuits, a communication circuit, and so forth. The memory is a ROM, a RAM, or the like, and is capable of storing a control program (computer program) executed by the processor. For example, the processor operates in accordance with the control program (computer program), which results in the ECU implementing various functions. The computer program is constituted by combining a plurality of instruction codes indicating instructions for the processor to achieve a predetermined function. Here, the description is based on the assumption that a malicious ECU that transmits a malicious frame can possibly be connected to the buses 500*a* and 500*b*.

The fraud-detection ECUs 100*a* and 100*b* are ECUs connected to the bus 500*a* and the bus 500*b*, respectively, and having a function of determining whether or not frames transmitted from the ECUs 400*a* to 400*d*, etc. are malicious and transmitting an error frame if fraud is present.

The ECUs 400*a* to 400*d* are each connected to any bus, and are connected to an engine 401, brakes 402, a door open/close sensor 403, and a window open/close sensor 404, respectively. Each of the ECUs 400*a* to 400*d* acquires the state of the device connected thereto (such as the engine 401), and periodically transmits a frame (data frame described below) or the like indicating the state to a network (that is, the bus).

The gateway 300 is connected to the bus 500*a* to which the fraud-detection ECU 100*a*, the ECU 400*a*, and the ECU 400*b* are coupled, the bus 500*b* to which the fraud-detection ECU 100*b*, the ECU 400*c*, and the ECU 400*d* are coupled, and the bus 500*c* to which the head unit 200 is coupled, and has a function of transferring a frame received from each bus to any other bus. It is also possible to switch for each connected bus between whether or not to transfer a received frame. The gateway 300 is also a kind of ECU.

The head unit 200 has a function of receiving a frame, and has a function of receiving frames transmitted from the ECUs 400a to 400d and displaying various states on a display (not illustrated) to present the states to a user. The head unit 200 is also a kind of ECU.

In the in-vehicle network system 10, each ECU sends and receives frames in accordance with the CAN protocol. There are the following frames in the CAN protocol: a data frame, a remote frame, an overload frame, and an error frame. The description will first focus on the data frame and the error frame, for convenience of illustration.

1.2 Data Frame Format

A description will now be given of the data frame, which is a frame used in a network compliant with the CAN protocol.

Figure 2:
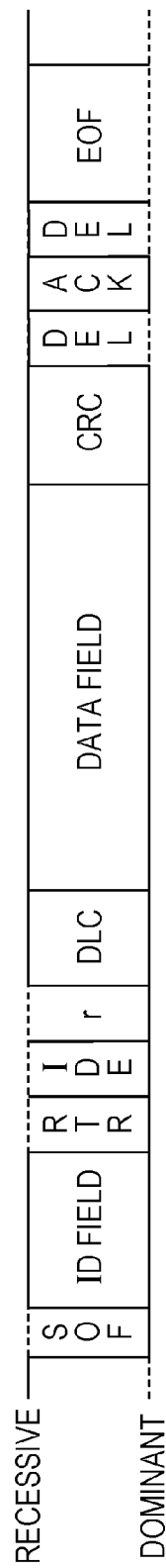
FIG. 2 is a diagram illustrating the format of a data frame specified in the CAN protocol.

FIG. 2 is a diagram illustrating the format of a data frame specified in the CAN protocol. In this figure there is illustrated a data frame in the standard ID format specified in the CAN protocol. The data frame is made up of the following fields: SOF (Start Of Frame), ID field, RTR (Remote Transmission Request), IDE (Identifier Extension), reserved bit "r", DLC (Data Length Code), data field, CRC (Cyclic Redundancy Check) sequence, CRC delimiter "DEL", ACK (Acknowledgement) slot, ACK delimiter "DEL", and EOF (End Of Frame).

The SOF is made up of one dominant bit. The recessive value is set for a state where a bus is idle, and is changed to the dominant value by the SOF to provide notification of the start of frame transmission.

The ID field is a field made up of 11 bits for storing an ID (message ID) that is a value indicating a type of data. It is designed such that a high priority is placed on a frame whose ID has a small value in order to use the ID field to arbitrate communication when a plurality of nodes simultaneously start transmission.

The RTR is a value for identifying a data frame and a remote frame from each other, and is made up of one dominant bit for a data frame.

The IDE and "r" are both made up of one dominant bit.

The DLC is made up of 4 bits, and is a value indicating the length of the data field. The IDE, "r", and the DLC are collectively referred to as a control field.

The data field is a value made up of up to 64 bits, indicating the content of data to be transmitted. The length is adjustable every 8 bits. The specification of data to be sent is not specified in the CAN protocol and is defined in the in-vehicle network system 10. Accordingly, the specification is dependent on the type of vehicle, the manufacturer (producer), and so forth.

The CRC sequence is made up of 15 bits. The CRC sequence is calculated by using transmission values of the SOF, the ID field, the control field, and the data field.

The CRC delimiter is a delimiter made up of one recessive bit, indicating the end of the CRC sequence. The CRC sequence and the CRC delimiter are collectively referred to as a CRC field.

The ACK slot is made up of 1 bit. A transmitting node sets the recessive value in the ACK slot when transmitting the frame. A receiving node sets the dominant value in the ACK slot and transmits the frame if the receiving node has been able to correctly receive the frame up to the CRC sequence. Since the dominant value overrides the recessive value, if the ACK slot is constituted by the dominant value after transmission, the transmitting node can confirm that any receiving node has been successful in receiving the frame.

The ACK delimiter is a delimiter made up of one recessive bit, indicating the end of the ACK.

The EOF is made up of 7 recessive bits, and indicates the end of the data frame.

1.3 Error Frame Format

FIG. 3 is a diagram illustrating the format of an error frame specified in the CAN protocol. The error frame is constituted by an error flag (primary), an error flag (secondary), and an error delimiter.

The error flag (primary) is used to inform any other node of the occurrence of an error. A node that has detected an error transmits 6 consecutive dominant bits in order to inform any other node of the occurrence of the error. This transmission violates a bit-stuffing rule (in which the same value should not be transmitted over 6 or more consecutive bits) in the CAN protocol, and induces the transmission of an error frame (secondary) from any other node.

The error flag (secondary) is made up of 6 consecutive dominant bits, which is used to inform any other node of the occurrence of an error. AN the nodes that have received the error flag (primary) and detected the violation of the bit-stuffing rule transmit an error flag (secondary).

The error delimiter "DEL" is made up of 8 consecutive recessive bits, and indicates the end of the error frame.

1.4 Configuration of Head Unit 200

The head unit 200 is a kind of ECU disposed on, for example, an instrument panel or the like of an automobile, including a display device such as a liquid crystal display (LCD) for displaying information to be viewed by a driver, an input unit that accepts the operation of the driver, and so forth.

FIG. 4 is a configuration diagram of the head unit 200. The head unit 200 is configured to include a frame transceiving unit 270, a frame interpretation unit 260, a reception-ID judgment unit 240, a reception-ID list holding unit 250, a frame processing unit 220, a display control unit 210, and a frame generation unit 230. These constituent elements are functional ones, and each of their functions is implemented by an element in the head unit 200, such as a communication circuit, an LCD, a processor that executes a control program stored in a memory, or a digital circuit.

The frame transceiving unit 270 transmits and receives a frame compliant with the CAN protocol to and from the bus 500c. The frame transceiving unit 270 receives a frame from the bus 500c bit-by-bit, and transfers the frame to the frame interpretation unit 260. Further, the frame transceiving unit 270 transmits the content of a frame of which the frame transceiving unit 270 has been notified by the frame generation unit 230 to the bus 500c bit-by-bit.

The frame interpretation unit 260 receives the values of the frame from the frame transceiving unit 270, and interprets the values so as to map the values into the respective fields in a frame format specified in the CAN protocol. The frame interpretation unit 260 transfers a value judged to correspond to the ID field to the reception-ID judgment unit 240. In accordance with a determination result sent from the reception-ID judgment unit 240, the frame interpretation unit 260 determines whether to transfer the value in the ID field and the data field that appears after the ID field to the frame processing unit 220 or to abort reception of the frame (that is, abort interpretation of the frame) after the determination result has been received. Further, the frame interpretation unit 260 notifies the frame generation unit 230 of a request to transmit an error frame if the frame is judged not to comply with the CAN protocol, for example, if the values of the CRC do not match or if an item whose value should be fixed to the dominant value has the recessive value.

Further, when an error frame is received, that is, when an error frame is interpreted to have started from a value in the received frame, the frame interpretation unit 260 discards the subsequent part of the frame, that is, aborts interpretation of the frame. For example, in a case where an error frame is interpreted to have started in the middle of the data frame, the interpretation of the data frame is aborted and a particular process is not performed according to the data frame.

The reception-ID judgment unit 240 receives the value in the ID field sent from the frame interpretation unit 260, and determines whether or not to receive the respective fields of the frame after the ID field, in accordance with a list of message IDs held in the reception-ID list holding unit 250. The reception-ID judgment unit 240 notifies the frame interpretation unit 260 of the determination result.

The reception-ID list holding unit 250 holds a reception-ID list that is a list of IDs (message IDs) which the head unit 200 receives. FIG. 5 is a diagram illustrating an example of the reception-ID list. The head unit 200 receives a frame (message) whose message ID is "1" from the ECU 400a connected to the engine 401, a frame whose message ID is "2" from the ECU 400b connected to the brakes 402, a frame whose message ID is "3" from the ECU 400c connected to the door open/close sensor 403, and a frame whose message ID is "4" from the ECU 400d connected to the window open/close sensor 404.

On the basis of the content of the received frame (for example, the message ID and the content of the data field), for example, the frame processing unit 220 forms an image to be displayed on the LCD and notifies the display control unit 210 of the image. The frame processing unit 220 may hold the received content of the data field and select and send an image to be displayed on the LCD (for example, an image for displaying the vehicle speed, an image for displaying the open or closed state of a window, etc.) in accordance with the operation of the driver which has been accepted through the input unit.

The display control unit 210 displays, on the LCD or the like, the content of which the display control unit 210 has been notified by the frame processing unit 220.

In accordance with a notification of instructions from the frame interpretation unit 260 to transmit an error frame, the frame generation unit 230 forms an error frame and notifies the frame transceiving unit 270 of the error frame for transmission.

1.5 Example Reception-ID List 1

FIG. 5 is a diagram illustrating an example of a reception-ID list held in each of the head unit 200, the gateway 300, the ECU 400c, and the ECU 400d. The reception-ID list illustrated by way of example in this figure is used to selectively receive and process a frame including a message ID that is an ID (message ID) whose value is any of "1", "2", "3", and "4". For example, the reception-ID list holding unit 250 of the head unit 200 holds the reception-ID list illustrated in FIG. 5. In this case, for a frame whose message ID is none of "1", "2", "3", and "4", the interpretation of the portion of the frame subsequent to the ID field by the frame interpretation unit 260 is aborted.

1.6 Configuration of Gateway 300

Figures 6, 7:
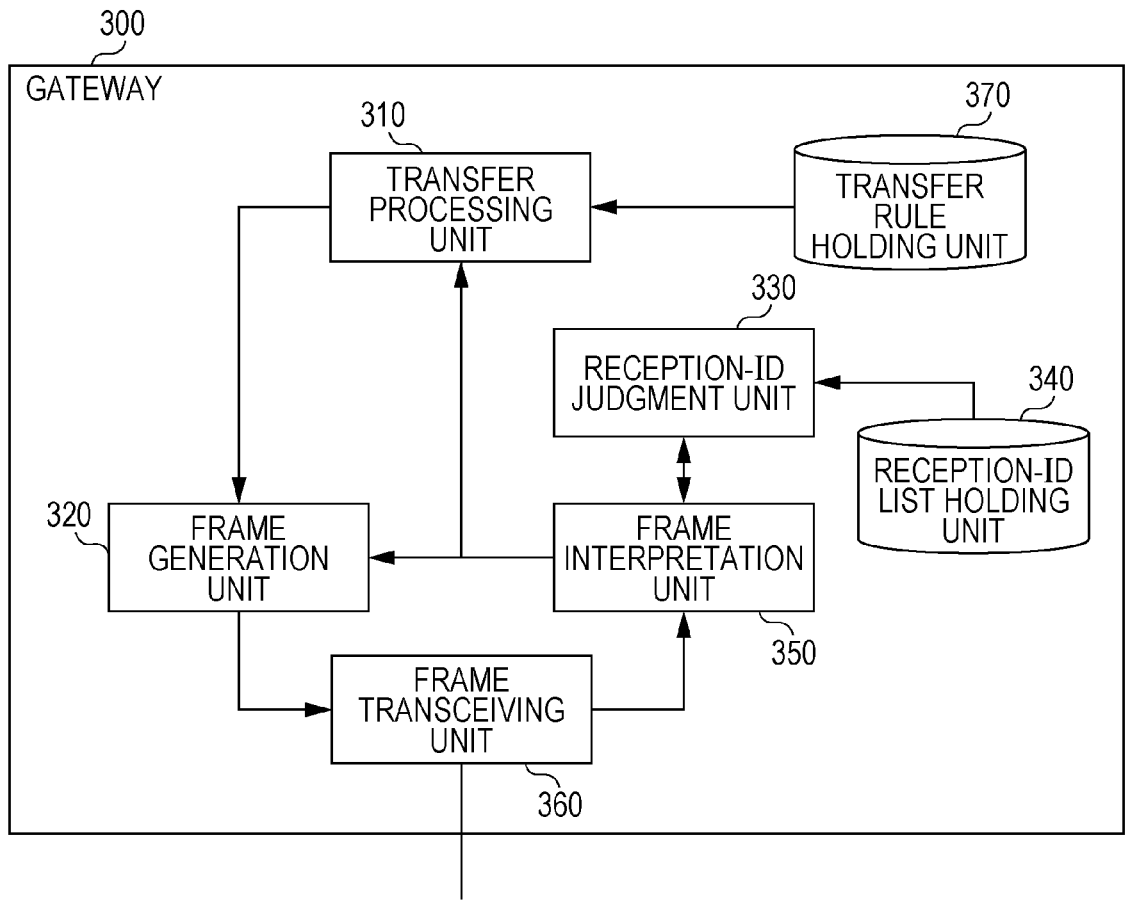
FIG. 6 is a configuration diagram of a gateway.
FIG. 7 is a diagram illustrating an example of transfer rules.

FIG. 6 is a configuration diagram of the gateway 300. The gateway 300 is configured to include a frame transceiving unit 360, a frame interpretation unit 350, a reception-ID judgment unit 330, a reception-ID list holding unit 340, a frame generation unit 320, a transfer processing unit 310, and a transfer rule holding unit 370. These constituent elements are functional ones, and each of their functions is implemented by an element in the gateway 300, such as a communication circuit, a processor that executes a control program stored in a memory, or a digital circuit.

The frame transceiving unit 360 transmits and receives a frame compliant with the CAN protocol to and from each of the buses 500a, 500b, and 500c. The frame transceiving unit 360 receives a frame from a bus bit-by-bit, and transfers the frame to the frame interpretation unit 350. Further, the frame transceiving unit 360 transmits the content of the frame to the buses 500a, 500b, and 500c bit-by-bit on the basis of the frame and bus information indicating a bus at the transfer destination of which the frame transceiving unit 360 has been notified by the frame generation unit 320.

The frame interpretation unit 350 receives the values of the frame from the frame transceiving unit 360, and interprets the values so as to map the values into the respective fields in a frame format specified in the CAN protocol. The frame interpretation unit 350 transfers a value judged to correspond to the ID field to the reception-ID judgment unit 330. In accordance with a determination result sent from the reception-ID judgment unit 330, the frame interpretation unit 350 determines whether to transfer the value in the ID field and the data field (data) that appears after the ID field to the transfer processing unit 310 or to abort reception of the frame (that is, abort interpretation of the frame) after the determination result has been received. Further, the frame interpretation unit 350 notifies the frame generation unit 320 of a request to transmit an error frame if the frame is judged not to comply with the CAN protocol. Further, when an error frame is received, that is, when an error frame is interpreted to have started from a value in the received frame, the frame interpretation unit 350 discards the subsequent part of the frame, that is, aborts interpretation of the frame.

The reception-ID judgment unit 330 receives the value in the ID field sent from the frame interpretation unit 350, and determines whether or not to receive the respective fields of the frame after the ID field, in accordance with a list of message IDs held in the reception-ID list holding unit 340. The reception-ID judgment unit 330 notifies the frame interpretation unit 350 of the determination result.

The reception-ID list holding unit 340 holds a reception-ID list (see FIG. 5) that is a list of IDs (message IDs) which the gateway 300 receives.

The transfer processing unit 310 determines a bus to which transfer is made in accordance with transfer rules held in the transfer rule holding unit 370 on the basis of the message ID of the received frame, and notifies the frame generation unit 320 of bus information indicating the bus to which transfer is made and the message ID and data sent from the frame interpretation unit 350. Note that the gateway 300 does not transfer an error frame received from a certain bus to any other bus.

The transfer rule holding unit 370 holds transfer rules that are information representing rules for the transfer of frames to the respective buses. FIG. 7 is a diagram illustrating an example of the transfer rules.

In accordance with a notification of instructions to transmit an error frame, which is sent from the frame interpretation unit 350, the frame generation unit 320 forms an error frame and notifies the frame transceiving unit 360 of the error frame for transmission. Further, the frame generation unit 320 forms a frame by using the message ID and data sent from the transfer processing unit 310, and notifies the frame transceiving unit 360 of the frame and the bus information.

1.7 Example Transfer Rules

FIG. 7 illustrates an example of transfer rules held in the gateway 300. The transfer rules associate buses at transfer sources, buses at transfer destinations, and IDs (message IDs) to be transferred with one another. In FIG. 7, "*" indicates that a frame is transferred regardless of the message ID. In this figure, furthermore, "-" indicates no frame to be transferred. The illustrated example indicates that a frame received from the bus 500*a* is set to be transferred to the bus 500*b* and the bus 500*c* regardless of the message ID. It also indicates that, among the frames received from the bus 500*b*, all the frames are set to be transferred to the bus 500*c* whereas only a frame whose message ID is "3" is set to be transferred to the bus 500*a*. It also indicates that a frame received from the bus 500*c* is set not to be transferred to the bus 500*a* or the bus 500*b*.

1.8 Configuration of ECU 400*a*

FIG. 8 is a configuration diagram of the ECU 400*a*. The ECU 400*a* is configured to include a frame transceiving unit 460, a frame interpretation unit 450, a reception-ID judgment unit 430, a reception-ID list holding unit 440, a frame processing unit 410, a frame generation unit 420, and a data acquisition unit 470. These constituent elements are functional ones, and each of their functions is implemented by an element in the ECU 400*a*, such as a communication circuit, a processor that executes a control program stored in a memory, or a digital circuit.

The frame transceiving unit 460 transmits and receives a frame compliant with the CAN protocol to and from the bus 500*a*. The frame transceiving unit 460 receives a frame from the bus 500*a* bit-by-bit, and transfers the frame to the frame interpretation unit 450. Further, the frame transceiving unit 460 transmits the content of a frame of which the frame transceiving unit 460 has been notified by the frame generation unit 420 to the bus 500*a*.

The frame interpretation unit 450 receives the values of the frame from the frame transceiving unit 460, and interprets the values so as to map the values into the respective fields in a frame format specified in the CAN protocol. The frame interpretation unit 450 transfers a value judged to correspond to the ID field to the reception-ID judgment unit 430. In accordance with a determination result sent from the reception-ID judgment unit 430, the frame interpretation unit 450 determines whether to transfer the value in the ID field and the data field that appears after the ID field to the frame processing unit 410 or to abort reception of the frame (that is, abort interpretation of the frame) after the determination result has been received. Further, the frame interpretation unit 450 notifies the frame generation unit 420 of a request to transmit an error frame if the frame is judged not to comply with the CAN protocol. Further, when an error frame is received, that is, when an error frame is interpreted to have started from a value in the received frame, the frame interpretation unit 450 discards the subsequent part of the frame, that is, aborts interpretation of the frame.

The reception-ID judgment unit 430 receives the value in the ID field sent from the frame interpretation unit 450, and determines whether or not to receive the respective fields of the frame after the ID field, in accordance with a list of message IDs held in the reception-ID list holding unit 440. The reception-ID judgment unit 430 notifies the frame interpretation unit 450 of the determination result.

The reception-ID list holding unit 440 holds a reception-ID list that is a list of ID (message IDs) which the ECU 400*a* receives. FIG. 9 is a diagram illustrating an example of the reception-ID list.

The frame processing unit 410 performs a process related to a function that is different for each ECU in accordance with the data of the received frame. For example, the ECU 400*a* connected to the engine 401 has a function of sounding an alarm when a door is open while the vehicle speed is over 30 km per hour. The ECU 400*a* includes, for example, a speaker or the like for sounding an alarm. The frame processing unit 410 of the ECU 400*a* manages data (for example, information indicating the state of the doors) received from any other ECU, and performs processes such as a process for sounding an alarm in a certain condition on the basis of the average speed per hour acquired from the engine 401.

The data acquisition unit 470 acquires data indicating the state of the elements connected to the ECUs, such as devices and sensors, and notifies the frame generation unit 420 of the data.

In accordance with a notification of instructions to transmit an error frame, which is sent from the frame interpretation unit 450, the frame generation unit 420 forms an error frame and notifies the frame transceiving unit 460 of the error frame for transmission. Further, the frame generation unit 420 adds a predetermined message ID to the value of the data sent from the data acquisition unit 470 to form a frame, and notifies the frame transceiving unit 460 of the frame.

Each of the ECUs 400*b* to 400*d* also has a configuration basically similar to that of the ECU 400*a* described above. However, the reception-ID list held in the reception-ID list holding unit 440 may have content different from one ECU to another. The ECU 400*b* holds the reception-ID list illustrated by way of example in FIG. 9, and the ECU 400*c* and the ECU 400*d* hold the reception-ID list illustrated by way of example in FIG. 5. Furthermore, the content of the process of the frame processing unit 410 differs from one ECU to another. For example, the content of the process of the frame processing unit 410 in the ECU 400*c* includes a process related to a function of sounding an alarm if a door is opened while the brakes are released. For example, the frame processing units 410 in the ECU 400*b* and the ECU 400*d* do not perform a special process. Each ECU may have functions other than those described for illustrative purposes here. The content of respective frames transmitted from the ECUs 400*a* to 400*d* will be described below with reference to FIGS. 10 to 13.

1.9 Example Reception-ID List 2

FIG. 9 is a diagram illustrating an example of a reception-ID list held in each of the ECU 400*a* and the ECU 400*b*. The reception-ID list illustrated by way of example in this figure is used to selectively receive and process a frame including a message ID that is an ID (message ID) whose value is any of "1", "2", and "3". For example, the reception-ID list holding unit 440 of the ECU 400*a* holds the reception-ID list illustrated in FIG. 9. In this case, for a frame whose message ID is none of "1", "2", and "3", the interpretation of the portion of the frame subsequent to the ID field by the frame interpretation unit 450 is aborted.

1.10 Example Transmission Frame from Engine-Related ECU 400*a*

FIG. 10 is a diagram illustrating an example of IDs (message IDs) and data fields (data) in frames transmitted from the ECU 400*a* connected to the engine 401. The frames transmitted from the ECU 400*a* have a message ID of "1". The data represents the average speed per hour (km/h), taking a value in the range from a minimum speed of 0 (km/h) to a maximum speed of 180 (km/h), and has a length of 1 byte. FIG. 10 illustrates, from top to bottom, message IDs and data corresponding to frames transmitted sequentially from the ECU 400*a*, by way of example, and depicts acceleration, increasing the speed from 0 km/h in increments of 1 km/h.

1.11 Example Transmission Frame from Brake-Related ECU 400b

FIG. 11 is a diagram illustrating an example of IDs (message IDs) and data fields (data) in frames transmitted from the ECU 400b connected to the brakes 402. The frames transmitted from the ECU 400b have a message ID of "2". The data represents the degree to which the brakes are applied, expressed as a percentage (%), and has a length of 1 byte. A percentage of 0(%) indicates a state where the brakes are not applied at all and 100(%) indicates a state where the brakes are maximally applied. FIG. 11 illustrates, from top to bottom, message ID and data corresponding to frames transmitted sequentially from the ECU 400b, by way of example, and depicts a gradual easing off of the brakes from 100%.

1.12 Example Transmission Frame from Door-Open/Close-Sensor-Related ECU 400c

FIG. 12 is a diagram illustrating an example of IDs (message IDs) and data fields (data) in frames transmitted from the ECU 400c connected to the door open/close sensor 403. The frames transmitted from the ECU 400c have a message ID of "3". The data represents the open or closed state for the door, and has a length of 1 byte. The data has the value "1" for a door-open state and the value "0" for a door-closed state. FIG. 12 illustrates, from top to bottom, message IDs and data corresponding to frames transmitted sequentially from the ECU 400c, by way of example, and depicts a gradual transition from the door-open state to the closed state.

1.13 Example Transmission Frame from Window-Open/Close-Sensor-Related ECU 400d

FIG. 13 is a diagram illustrating an example of IDs (message IDs) and data fields (data) in frames transmitted from the ECU 400d connected to the window open/close sensor 404. The frames transmitted from the ECU 400d have a message ID of 4. The data represents the open or closed state for the window, expressed as a percentage (%), and has a length of 1 byte. A percentage of 0(%) indicates a state where the window is completely closed and 100(%) indicates a state where the window is completely open. FIG. 13 illustrates, from top to bottom, message IDs and data corresponding to frames transmitted sequentially from the ECU 400d, by way of example, and depicts a gradual transition from the window-closed state to the open state.

1.14 Configuration of Fraud-Detection ECU 100a

Figures 14, 15, 16:
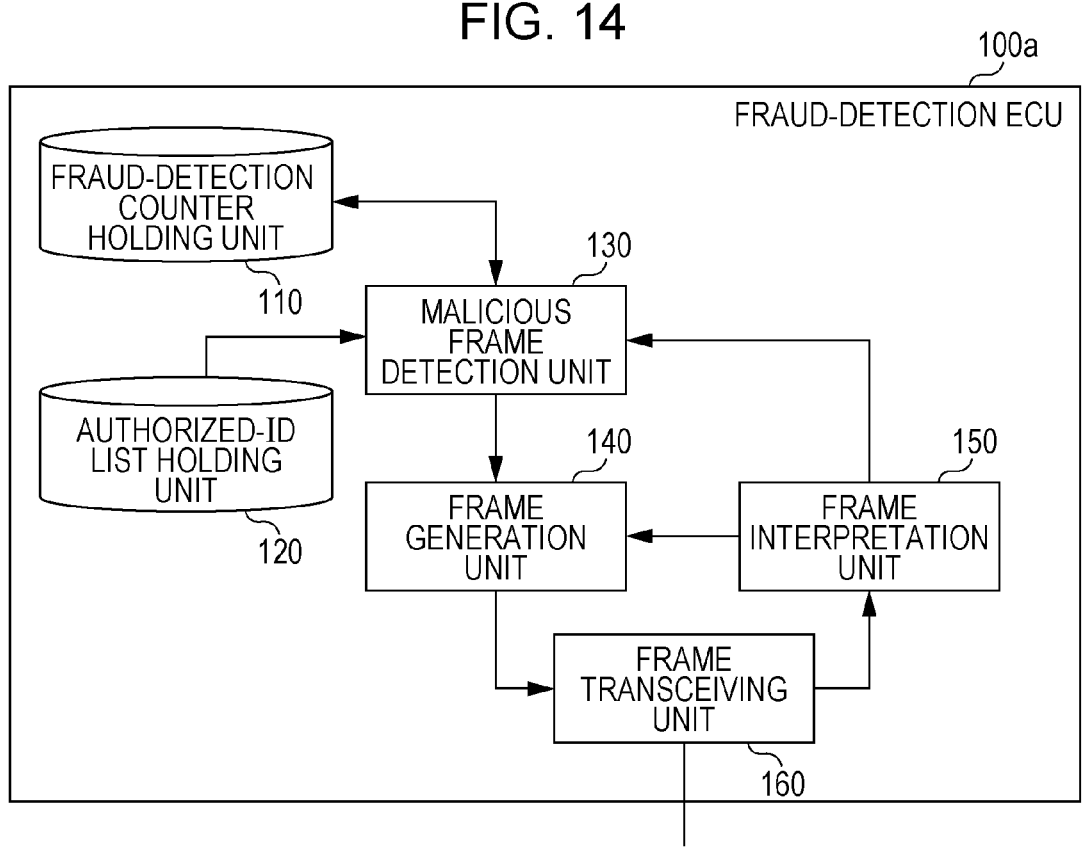
FIG. 14 is a configuration diagram of a fraud-detection ECU according to the first embodiment.
FIG. 15 is a diagram illustrating an example of an authorized-ID list held in the fraud-detection ECU.
FIG. 16 is a diagram illustrating an example of an authorized-ID list held in the fraud-detection ECU.

FIG. 14 is a configuration diagram of the fraud-detection ECU 100a. The fraud-detection ECU 100a is configured to include a frame transceiving unit 160, a frame interpretation unit 150, a malicious frame detection unit 130, an authorized-ID list holding unit 120, a fraud-detection counter holding unit 110, and a frame generation unit 140. These constituent elements are functional ones, and each of their functions is implemented by an element in the fraud-detection ECU 100a, such as a communication circuit, a processor that executes a control program stored in a memory, or a digital circuit. While the fraud-detection ECU 100b also has a configuration basically similar to that described above, the content of list information (authorized-ID list) held in the authorized-ID list holding unit 120 is different between the fraud-detection ECU 100a and the fraud-detection ECU 100b.

The frame transceiving unit 160 transmits and receives a frame compliant with the CAN protocol to and from the bus 500a. That is, the frame transceiving unit 160 serves as a so-called receiving unit that receives a frame when frame transmission on a bus is started, and serves as a so-called transmitting unit that transmits an error frame and the like to the bus. That is, the frame transceiving unit 160 receives a frame from the bus 500a bit-by-bit, and transfers the frame to the frame interpretation unit 150. Further, the frame transceiving unit 160 transmits the content of a frame of which the frame transceiving unit 160 has been notified by the frame generation unit 140 to the bus 500a.

The frame interpretation unit 150 receives the values of the frame from the frame transceiving unit 160, and interprets the values so as to map the values into the respective fields in a frame format specified in the CAN protocol. The frame interpretation unit 150 transfers a value judged to correspond to the ID field to the malicious frame detection unit 130. Further, the frame interpretation unit 150 notifies the frame generation unit 140 of a request to transmit an error frame if the frame is judged not to comply with the CAN protocol. Further, when an error frame is received, that is, when an error frame is interpreted to have started from a value in the received frame, the frame interpretation unit 150 discards the subsequent part of the frame, that is, aborts interpretation of the frame.

The malicious frame detection unit 130 receives the value in the ID field sent from the frame interpretation unit 150, and determines whether or not the value in the ID field meets a predetermined condition indicating fraud. That is, the malicious frame detection unit 130 functions as a so-called determination unit that determines whether or not the content of a predetermined field in a received frame meets a predetermined condition indicating fraud. The predetermined condition indicating fraud is a condition in which the value in the ID field is not included in the list of message IDs held in the authorized-ID list holding unit 120. That is, the malicious frame detection unit 130 determines whether or not the sent value (message ID) of the ID field is malicious, in accordance with the list of message IDs held in the authorized-ID list holding unit 120. If a message ID which is not included in this list (that is, an authorized-ID list described below) is received, the malicious frame detection unit 130 notifies the fraud-detection counter holding unit 110 of the received message ID in order to increment the number of times fraud has been detected. If a message ID which is not included in the authorized-ID list is received, furthermore, the malicious frame detection unit 130 notifies the frame generation unit 140 of a request to transmit an error frame. Further, when the number of times fraud has been detected reaches a certain number or more, the malicious frame detection unit 130 is notified of this by the fraud-detection counter holding unit 110, and notifies the frame generation unit 140 of a request to transmit an error display message (frame) indicating the presence of a malicious ECU that issues the corresponding message ID. The message ID of the error display message is determined in advance, and the head unit 200 is configured to receive a message (frame) having the message ID and to provide error display. Although the error display message is not described herein for convenience of illustration, the message ID of the error display message is contained in the reception-ID lists held in the gateway 300 and the head unit 200 and in the authorized-ID list described below. Note that the message ID for the error display message is not illustrated in FIG. 15 and FIG. 16.

The authorized-ID list holding unit 120 holds an authorized-ID list that is a list defining in advance message IDs included in frames to be transmitted on the bus 500a in the in-vehicle network system 10 (see FIG. 15 and FIG. 16).

The fraud-detection counter holding unit 110 holds, for each message ID, a fraud-detection counter for counting the number of times detection has been performed, and, upon being notified of a message ID by the malicious frame detection unit 130, increments (increases) the corresponding fraud-detection counter. When a fraud-detection counter reaches a certain number (a predetermined count) or more, the fraud-detection counter holding unit 110 notifies the malicious frame detection unit 130 that the certain number has been exceeded. Examples of the term "certain number (predetermined count)", as used here, include a value determined in accordance with handling rules for a transmission error counter in the CAN protocol. The CAN protocol specifies that the transmission error counter counts up by 8 each time an ECU blocks transmission by using an error frame. It also specifies that, as a result, when a transmission error counter in a transmitting node counts up to 128, the transmitting node transitions to a passive state so that no frame is transmitted. Accordingly, setting the certain number to 17, which is larger than 128/8 (=16), allows an error display message to be transmitted from the fraud-detection ECU 100a when the presence of a transmitting node (malicious ECU) that ignores the rule regarding a transmission error counter in the CAN protocol is estimated. If a malicious ECU that transmits a malicious frame follows the rule regarding a transmission error counter in the CAN protocol, the fraud-detection ECU 100a transmits an error frame, which results in the transmission error counter of the malicious ECU being incremented by 8. In this case, when the transmission error counter of the malicious ECU increases up to 128 due to the repeated transmission of a malicious frame, the malicious ECU transitions to the passive state top a malicious frame from being transmitted from the malicious ECU.

In accordance with a notification of instructions to transmit an error frame, which is sent from the frame interpretation unit 150, the frame generation unit 140 forms an error frame and notifies the frame transceiving unit 160 of the error frame for transmission. Further, in accordance with a notification of instructions to transmit an error frame, which is sent from the malicious frame detection unit 130, the frame generation unit 140 forms an error frame and notifies the frame transceiving unit 160 of the error frame for transmission. In addition, in accordance with a notification of instructions to transmit an error display message, which is sent from the malicious frame detection unit 130, furthermore, the frame generation unit 140 notifies the frame transceiving unit 160 of an error display message for transmission.

1.15 Example Authorized-ID List in Fraud-Detection ECU 100a

FIG. 15 is a diagram illustrating an example of an authorized-ID list held in the authorized-ID list holding unit 120 of the fraud-detection ECU 100a. The authorized-ID list illustrated by way of example in this figure indicates that a frame including a message ID that is an ID (message ID) whose value is any of "1", "2", and "3" may be allowed to flow over the bus 500a.

1.16 Example Authorized-ID List in Fraud-Detection ECU 100b

FIG. 16 is a diagram illustrating an example of an authorized-ID list held in the authorized-ID list holding unit 120 of the fraud-detection ECU 100b. The authorized-ID list illustrated by way of example in this figure indicates that a frame including a message ID that is an ID (message ID) whose value is any of "1", "2", "3", and "4" may be allowed to flow over the bus 500b.

1.17 Example Fraud-Detection-Counter Saving List

Figure 17:
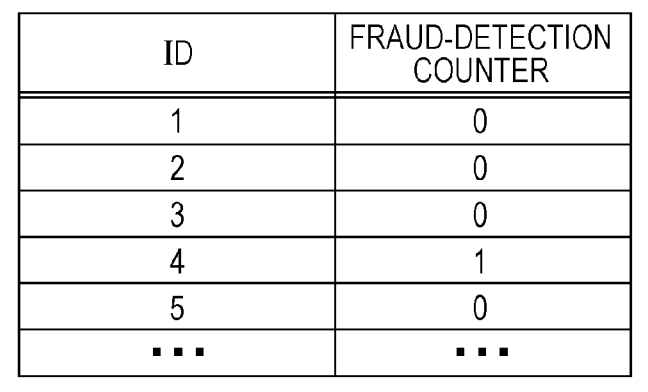

FIG. 17 is a diagram illustrating an example of the states of fraud-detection counters for individual message IDs. The illustrated example indicates that only a fraud-detection counter for which the message ID is "4" has detected fraud once while no fraud has been detected for the other message IDs. That is, the illustrated example indicates a case where the fraud-detection ECU 100a has detected that a message (frame) with the message ID "4", which would not have flowed over the bus 500a, has been transmitted once and the fraud-detection counter corresponding to the message ID "4" has been incremented by 1.

1.18 Sequence for Malicious-Frame Detection

A description will now be given of the operation of the fraud-detection ECU 100a, the ECU 400a, the ECU 400b, the gateway 300, and so forth connected to the bus 500a in the in-vehicle network system 10 having the configuration described above in a case where a malicious ECU is connected to the bus 500a.

Figure 18:
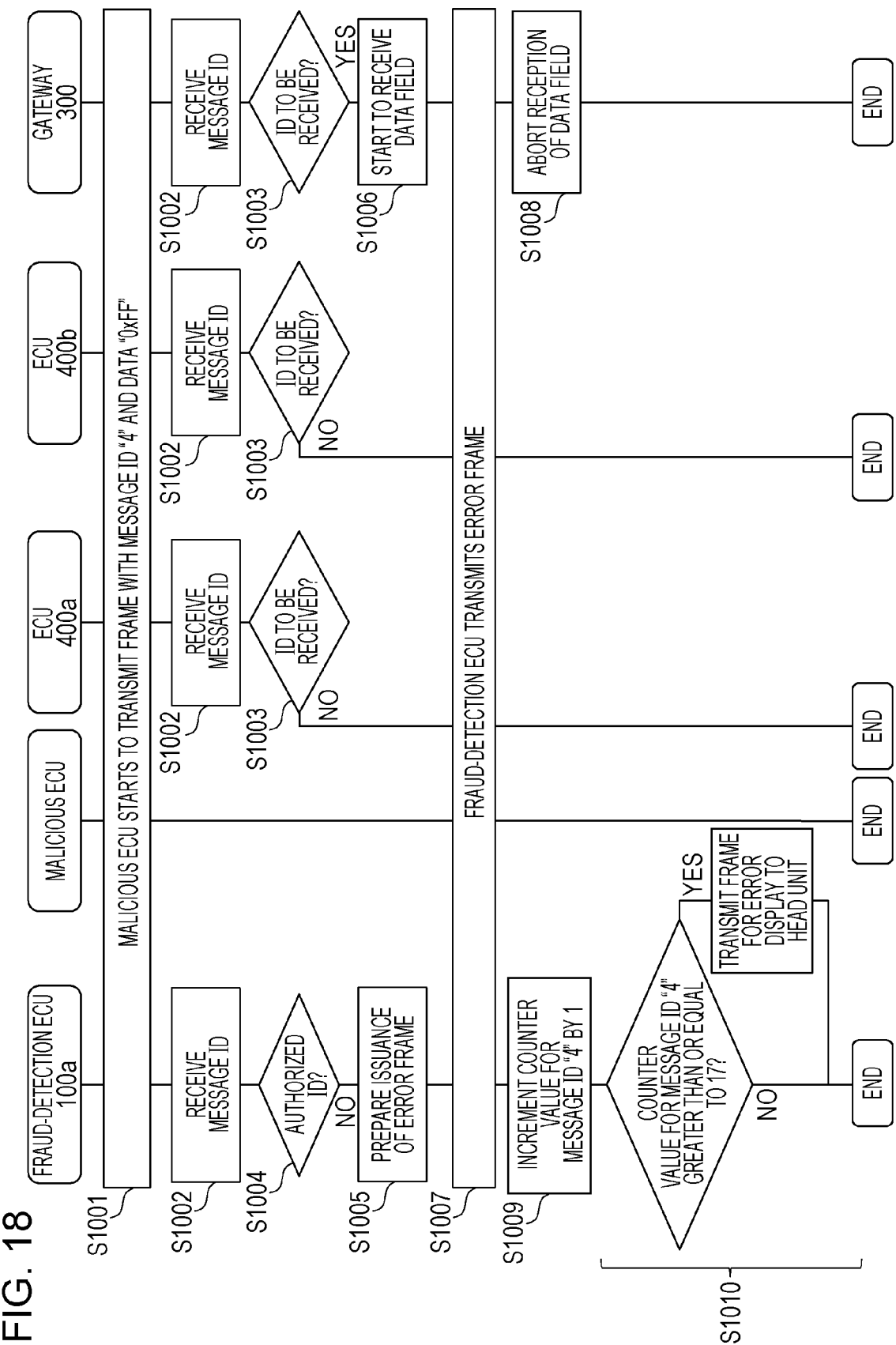
FIG. 18 is a sequence diagram illustrating an example operation for detecting a malicious frame and preventing execution of the malicious frame in the first embodiment.

FIG. 18 is a sequence diagram illustrating an example operation for, in response to detection of a malicious frame (message) by the fraud-detection ECU 100a, preventing any other ECU from performing a process corresponding to the malicious frame. In this figure there is illustrated an example in which a malicious ECU transmits a data frame whose message ID is "4" and data field (data) is "255 (0xFF)" to the bus 500a. Here, respective sequences represent individual process procedures (steps) performed by various devices.

First, a malicious ECU starts to transmit a data frame whose message ID is "4" and data is "255 (0xFF)" (sequence S1001). The values of the bits included in the frame are sequentially delivered to the bus 500a in the order of the SOF, the ID field (message ID), etc. In accordance with the data frame format described above.

When the malicious ECU completes the delivery of the frame up to the ID field (message ID) to the bus 500a, each of the fraud-detection ECU 100a, the ECU 400a, the ECU 400b, and the gateway 300 receives a message ID (sequence S1002).

Each of the ECU 400a, the ECU 400b, and the gateway 300 checks the message ID by using the reception-ID list held therein (sequence S1003). At this time, the fraud-detection ECU 100a checks the message ID by using the authorized-ID list held therein (sequence S1004). That is, the fraud-detection ECU 100a determines whether or not the content of the ID field in the transmitted frame meets a predetermined condition (in which the content is not contained in the authorized-ID list) indicating fraud.

In sequence S1003, the ECU 400a and the ECU 400b terminate reception since the respectively held reception-ID lists do not include "4" (see FIG. 9). That is, a frame that the malicious ECU continuously transmits is no longer interpreted, nor is the process corresponding to the frame performed. In sequence S1003, furthermore, the gateway 300 continues reception since the held reception-ID list includes "4" (see FIG. 5). In sequence S1004, the fraud-detection ECU 100a judges that the message ID is malicious since the held authorized-ID list does not include "4", and then starts to prepare the issuance of an error frame (sequence S1005).

Subsequently to sequence S1003, the gateway 300 continues the reception of the frame. For example, while the fraud-detection ECU 100a is preparing the issuance of an error frame, the part subsequent to the ID field, namely, the RTR and the control field (IDE, r, DLC), is sequentially delivered to the bus 500a from the malicious ECU, and then the data field is sequentially delivered bit-by-bit. The gateway 300 receives the RTR and the control field (IDE, r, DLC), and then starts the reception of the data field (sequence S1006).

Then, the preparation of the issuance of an error frame is completed, and the fraud-detection ECU 100a transmits an error frame (sequence S1007). The transmission of the error frame is performed before the end of the malicious frame is transmitted (for example, before the end of the CRC sequence is transmitted). In the illustrated example operation, the error frame is transmitted in the middle of the data field. The transmission of the error frame is started, thus allowing the middle part of the data field in the frame being transmitted from the malicious ECU to be overwritten with the error frame (a bit sequence of the prioritized dominant value) on the bus 500a.

Upon receipt of the error frame transmitted in sequence S1007, the gateway 300 aborts reception of the frame being transmitted from the malicious ECU during the reception of the data field (sequence S1008). That is, the data field from the malicious ECU has been overwritten with the error frame, and the gateway 300 detects the error frame and thus does not continue the reception of the frame being transmitted from the malicious ECU.

The fraud-detection ECU 100a increments the fraud-detection counter corresponding to the message ID "4" of the data frame for which the error frame has been transmitted (sequence S1009).

If the fraud-detection counter corresponding to the message ID "4" becomes greater than or equal to 17 as a result of the increment, the fraud-detection ECU 100a transmits a frame indicating error display (error display message) so that the frame can be received by the head unit 200 (sequence S1010). Consequently, the frame processing unit 220 of the head unit 200 performs a process for providing error display, and an error notification is issued via an LCD or the like. The error notification may be issued via, in place of display on an LCD or the like, audio output, light emission, or the like.

1.19 Advantageous Effects of First Embodiment

A fraud-detection ECU illustrated in the first embodiment determines whether or not a transmitted frame (data frame) is a malicious frame by using an authorized-ID list in terms of the ID field of the frame. This enables the occurrence of fraud to be determined on the basis of the ID field in the data frame, and can thus prevent existing nodes (that is, ECUs other than a fraud-detection ECU and a malicious ECU) from interpreting a malicious frame and from performing a process corresponding to the frame. In addition, it is only required to receive the portion up to the ID field subsequent to the SOF at the beginning of the data frame to perform determination. This makes it possible to reduce bus traffic, compared to the case where determination is performed after the receipt of the latter part or the like of the data frame.

In addition, the fraud-detection ECU counts the number of times an error frame has been transmitted, by using a fraud-detection counter, and can thus detect that a transmission error counter in a node that transmits a malicious message ID has reached an upper limit value at which the transition to the passive state is required according to the CAN protocol in response to receipt of an error frame. This makes it possible to determine whether or not a node that transmits a malicious message ID is compatible with the specification of an error counter in the CAN protocol.

In addition, the use of only a fraud-detection ECU as a node for determining the presence of a malicious frame can minimize the effect on the existing network configuration, resulting in the amount of processing and the amount of power consumption being reduced in the entire system.

Second Embodiment

An embodiment of the present disclosure will now be described in the context of an in-vehicle network system 11 including a fraud-detection ECU that implements a fraud-detection method for detecting a malicious frame by using rules for frame transmission which are defined for individual message IDs.

2.1 Overall Configuration of in-Vehicle Network System 11

Figure 19:
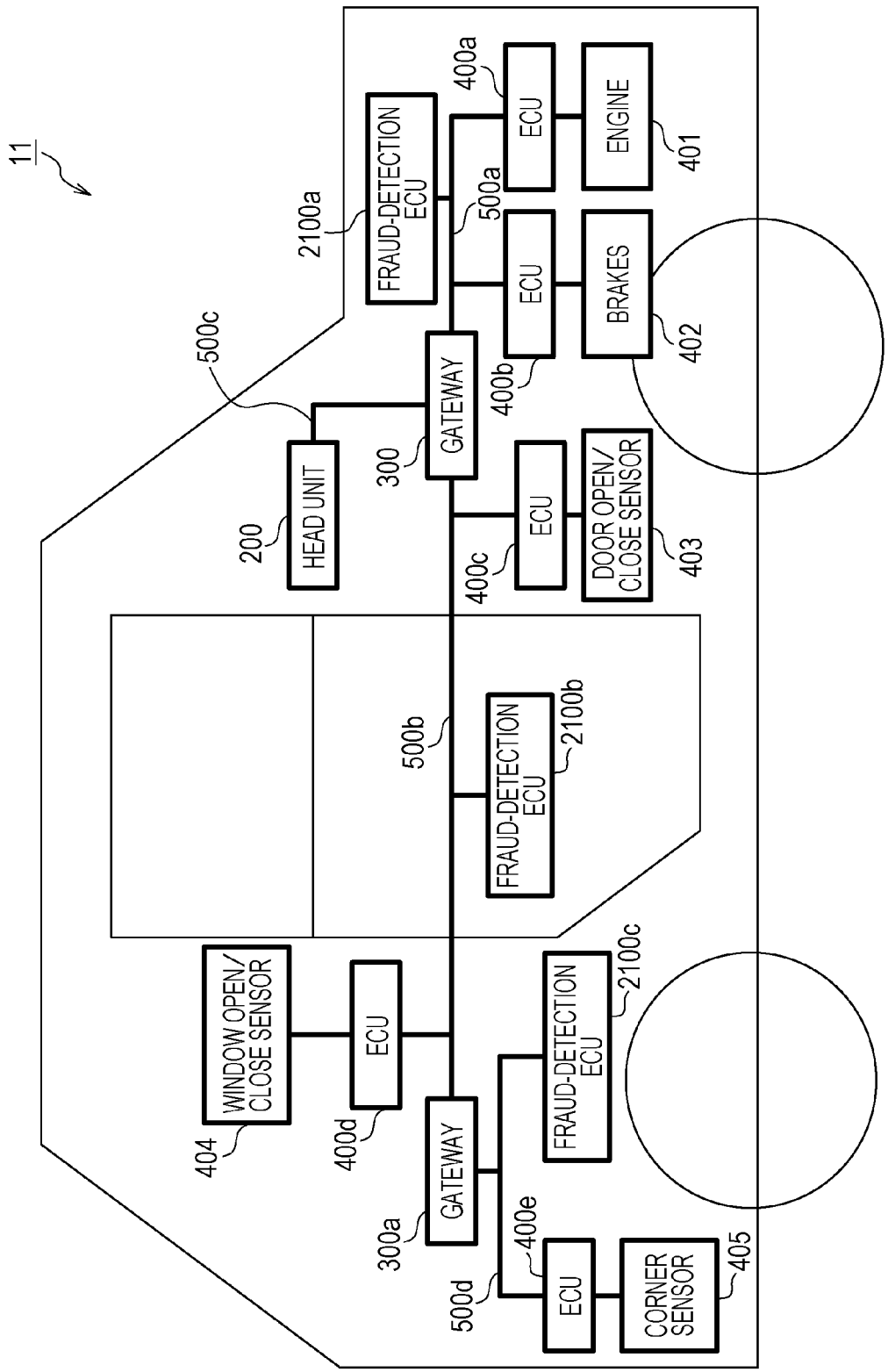
FIG. 19 is a diagram illustrating an overall configuration of an in-vehicle network system according to a second embodiment.

FIG. 19 is a diagram illustrating an overall configuration of the in-vehicle network system 11 according to a second embodiment. The in-vehicle network system 11 is obtained by modifying part of the in-vehicle network system 10 illustrated in the first embodiment.

The in-vehicle network system 11 is configured to include fraud-detection ECUs 2100a to 2100c, a head unit 200, gateways 300 and 300a, and nodes connected to buses, such as ECUs 400a to 400e connected to various devices. Of the constituent elements of the in-vehicle network system 11, constituent elements having functions similar to those in the first embodiment are designated by the same numerals and are not described. The ECU 400e is connected to a bus 500d and is connected to a corner sensor 405. The ECU 400e has a configuration similar to that of the ECUs 400a to 400d illustrated in the first embodiment. Further, the ECU 400e acquires the state of the corner sensor 405 and periodically transmits a data frame indicating the state to the bus 500d. In addition, the gateway 300 connects the buses 500a to 500c, and the gateway 300a connects the bus 500b and the bus 500d. The fraud-detection ECUs 2100a, 2100b, and 2100c are obtained by modifying the fraud-detection ECU 100a illustrated in the first embodiment, and are connected to the buses 500a, 500b, and 500d, respectively. The fraud-detection ECUs 2100a to 2100c are ECUs having a function of determining whether or not frames transmitted from the ECUs 400a to 400e, etc. are malicious and transmitting an error message that is a data frame for providing notification of error in the case of fraud.

2.2 Configuration of Fraud-Detection ECU 2100c

Figures 20, 21, 22, 23:
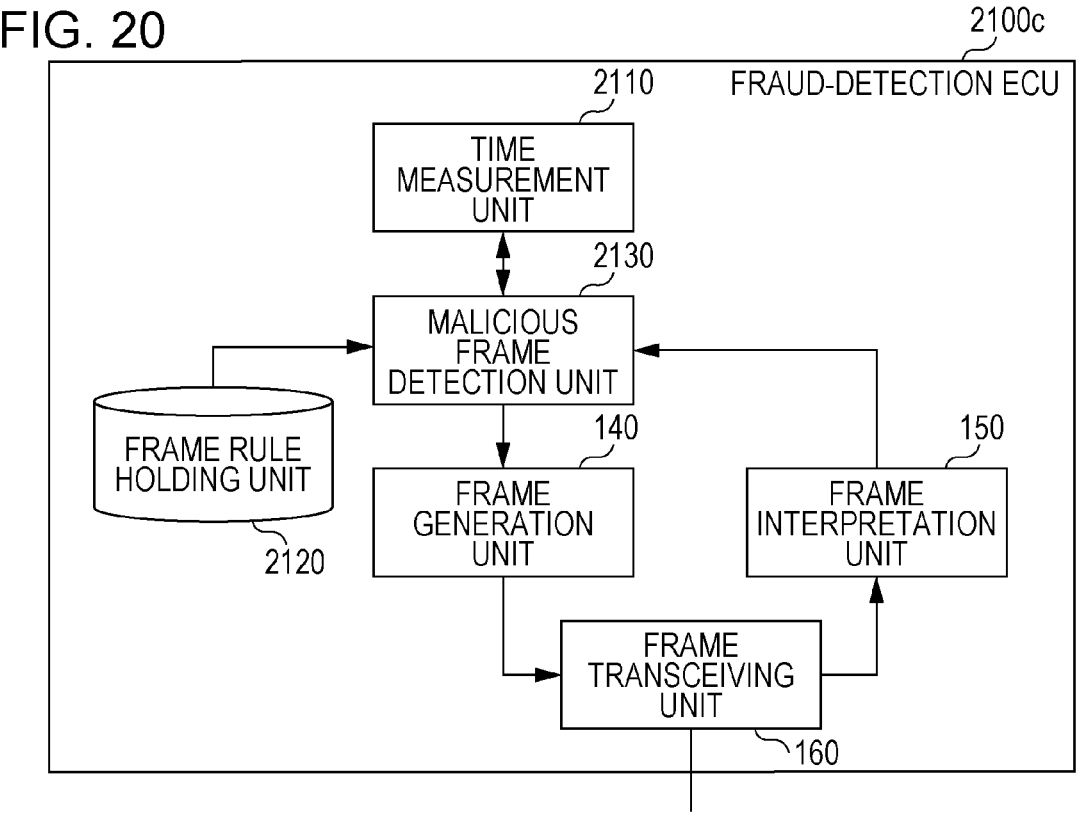
FIG. 20 is a configuration diagram of a fraud-detection ECU according to the second embodiment.
FIG. 21 is a diagram illustrating an example of a frame rule.
FIG. 22 is a diagram illustrating an example of the configuration of an error message in the second embodiment.
FIG. 23 is a diagram illustrating an example of transfer rules.

FIG. 20 is a configuration diagram of the fraud-detection ECU 2100c. The fraud-detection ECU 2100c is configured to include a frame transceiving unit 160, a frame interpretation unit 150, a malicious frame detection unit 2130, a frame generation unit 140, a time measurement unit 2110, and a frame rule holding unit 2120. These constituent elements are functional ones, and each of their functions is implemented by an element in the fraud-detection ECU 2100c, such as a communication circuit, a processor that executes a control program stored in a memory, or a digital circuit. The fraud-detection ECU 2100c is obtained by modifying part of the fraud-detection ECU 100a illustrated in the first embodiment, and constituent elements having functions similar to those in the first embodiment are designated by the same numerals and are not described.

The time measurement unit 2110 has a function of, upon receipt of notification of the message ID of a received frame (message) from the malicious frame detection unit 2130, providing notification of an elapsed time (measurement time) since the previous reception of notification of the message ID in response to receipt of the message ID until the current reception of notification of the message ID. The time measurement unit 2110 uses timers (counting mechanisms) corresponding to individual message IDs. Upon receipt of notification of a message ID, the time measurement unit 2110 stops the corresponding timer and notifies the malicious frame detection unit 2130 of the measurement time. After resetting the timer, the time measurement unit 2110 restarts time measurement with the timer. The time measurement unit 2110 takes special measures to handle the reception of notification of a message ID if the notification is the initial notification of the message ID, because a time period that has elapsed since the previous reception is not measurable. In this case, for example, the time measurement unit 2110 notifies the malicious frame detection unit 2130 of the time having a zero value and starts time measurement with the timer corresponding to the message ID.

The frame rule holding unit 2120 holds, in a storage medium such as a memory, a frame rule that is rule information concerning the transmission of a frame. The frame is a frame transmitted in compliance with the CAN protocol. The frame rule holding unit 2120 in the fraud-detection ECU 2100c holds a frame rule for a frame transmittable on the bus 500d to which the fraud-detection ECU 2100c is connected. FIG. 21 is a diagram illustrating an example of the frame rule. The frame rule is information that associates, for example, the message ID of a frame with the transmission cycle of the frame. In the illustrated example, the message ID "5" of a frame transmitted from the ECU 400e connected to the bus 500d and a transmission cycle of 20 to 30 msec are illustrated. This frame rule shows that a frame whose message ID is "5" is transmitted in a transmission cycle that falls within a range greater than or equal to 20 msec and less than or equal to 30 msec. A frame transmitted not in accordance with this frame rule is detected as a malicious frame. That is, in a case where a frame that does not follow the frame rule has been transmitted, it is judged that a malicious frame has been transmitted.

The malicious frame detection unit 2130 is obtained by modifying the malicious frame detection unit 130 illustrated in the first embodiment, and has a function of receiving the message ID of a frame received from the frame interpretation unit 150 and determining whether or not the frame is the one that has been maliciously transmitted. That is, the malicious frame detection unit 2130 functions as a so-called determination unit that determines whether or not a frame (message) transmitted on a bus is malicious by using the frame rule held in the frame rule holding unit 2120. Specifically, upon receipt of the ID (message ID) in the ID field from the frame interpretation unit 150, the malicious frame detection unit 2130 notifies the time measurement unit 2110 of the message ID. Upon acquisition of a measurement time from the time measurement unit 2110, the malicious frame detection unit 2130 refers to the frame rule held in the frame rule holding unit 2120 and verifies whether the measurement time complies with the frame rule. If the measurement time is out of the transmission cycle range, the malicious frame detection unit 2130 judges that a malicious frame has been transmitted. Note that if a transmission cycle has not been measured because of no previous reception (for example, if the time having a zero value has been acquired from the time measurement unit 2110), exceptionally the malicious frame detection unit 2130 does not judge that a malicious frame has been transmitted. Upon judging that a malicious frame has been transmitted, the malicious frame detection unit 2130 requests the frame generation unit 140 to transmit an error message for which the message ID of the frame is included in the data field of the data frame. In response to the request to transmit an error message, the frame generation unit 140 generates an error message and transmits the error message via the frame transceiving unit 160. Thus, the frame transceiving unit 160 functions as a so-called transmitting unit that transmits an error message and the like to a bus. Note that the malicious frame detection unit 2130 may be configured to cause the time measurement unit 2110 to perform time measurement of a frame judged to be malicious, except for the reception timing of the frame. This allows, also after the detection of fraud, the previous, authorized frame to be used as a reference to continue to correctly judge whether or not the transmission cycle of a later received frame is appropriate.

FIG. 22 is a diagram illustrating an example of the configuration of an error message generated by the frame generation unit 140 of the fraud-detection ECU 2100c. As illustrated byway of example in this figure, the error message is a data frame having an ID field configured with the ID value "2047 (0x7FF)", which is determined in advance for an error message, and a data field which includes the message ID of a frame detected to be malicious.

The fraud-detection ECUs 2100a and 2100b also have a configuration basically similar to that of the fraud-detection ECU 2100c. However, the frame rule held in the frame rule holding unit 2120 has content corresponding to a frame transmittable on a bus to which the corresponding fraud-detection ECU is connected. That is, a frame rule that each of a plurality of fraud-detection ECU connected to different buses stores in the memory or the like thereof has content in which the message ID of a frame transmitted on a bus connected thereto and a rule regarding the transmission of the message (such as a transmission cycle range) are associated with each other. It may also be probable to adopt a scheme in which each fraud-detection ECU holds a general frame rule defining transmission cycles of individual frames transmittable on any bus within the in-vehicle network system 11.

2.3 Example Transfer Rules of Gateway 300a

The gateway 300a has a configuration similar to that of the gateway 300 illustrated in the first embodiment (see FIG. 6). Note that a reception-ID list held in the reception-ID list holding unit 340 of the gateway 300a and transfer rules held in the transfer rule holding unit 370 have content corresponding to the buses 500b and 500d to which the gateway 300a is connected.

FIG. 23 is a diagram illustrating an example of transfer rules possessed by the gateway 300a. The illustrated example indicates that a frame received from the bus 500b is set to be transferred to the bus 500d regardless of the message ID. It is also indicated that, among the frames received from the bus 500d, only a frame whose message ID is "5" and a frame (error message) whose message ID is "2047" are set to be transferred to the bus 500b.

2.4 Example Transmission Frame from Corner-Sensor-Related ECU 400e

FIG. 24 is a diagram illustrating an example of IDs (message IDs) and data fields (data) in frames transmitted from the ECU 400e connected to the corner sensor 405. The frames transmitted from the ECU 400e have a message ID of "5". The data length is 1 byte, and the data has the value "1" if the presence of an obstacle within a certain range of distance from the corner of a vehicle is detected by the corner sensor 405, and the value "0" if no obstacle is detected. FIG. 24 illustrates, from top to bottom, message IDs and data corresponding to frames transmitted periodically from the ECU 400e, by way of example, and depicts a gradual transition from the state where no obstacle is detected around the corner of a vehicle to the state where an obstacle is detected.

2.5 Example Reception-ID List

FIG. 25 is a diagram illustrating an example of a reception-ID list held in the reception-ID list holding unit 440 in the ECU 400e having a configuration similar to that of the ECU 400a (see FIG. 8). The reception-ID list illustrated in this figure is used to selectively receive and process, by the ECU 400e, a frame including a message ID whose value is "5" or "2047". In this case, for a frame whose message ID is not "5" or "2047", the interpretation of the portion of the frame subsequent to the ID field is aborted in the frame interpretation unit 450 of the ECU 400e.

2.6 Sequence for Malicious-Frame Detection

A description will now be given of the operation of the fraud-detection ECU 2100c, the ECU 400e, the gateway 300a, and so forth connected to the bus 500d in the in-vehicle network system 11 having the configuration described above in a case where a malicious ECU is connected to the bus 500d.

Figure 26:
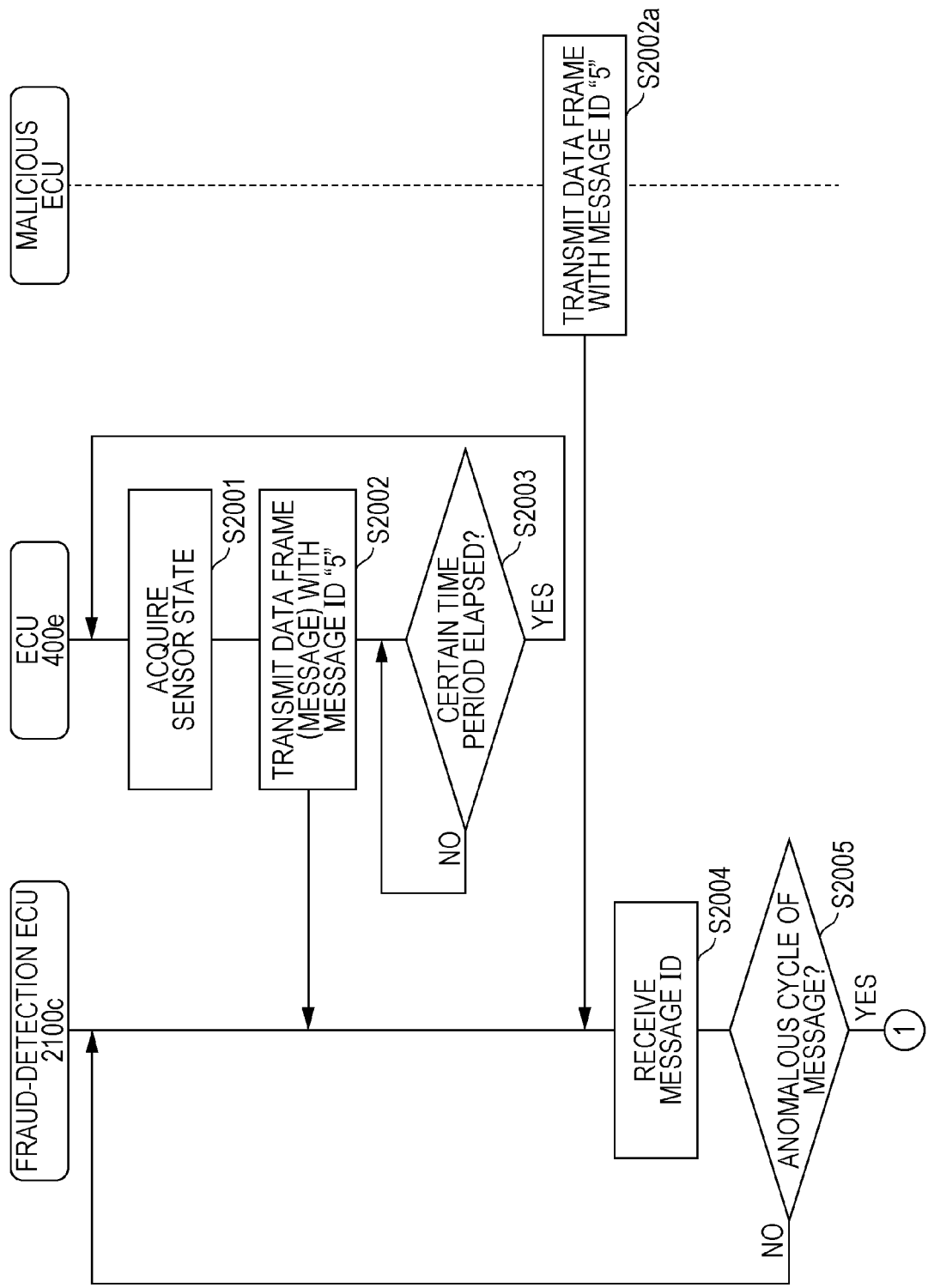
FIG. 26 is a sequence diagram illustrating an example operation for detecting a malicious frame and transmitting an error message in the second embodiment (continued in FIG. 27)
Figure 27:
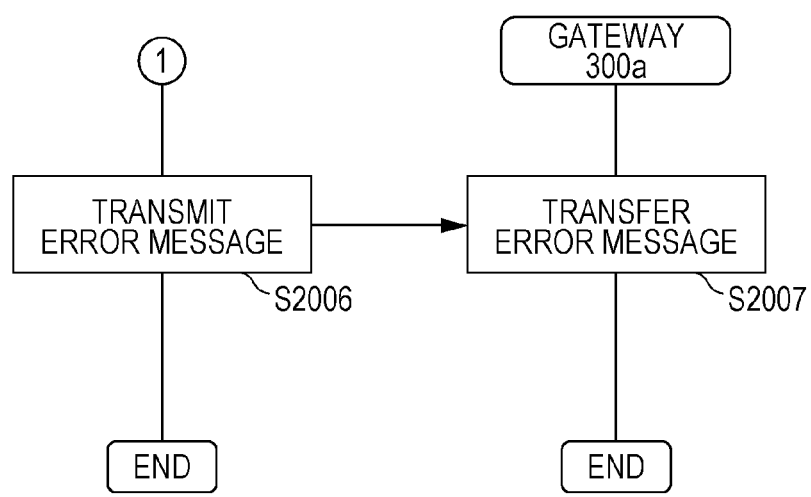
FIG. 27 is a sequence diagram illustrating the example operation for detecting a malicious frame and transmitting an error message in the second embodiment (continued from FIG. 26)

FIG. 26 and FIG. 27 are a sequence diagram illustrating an example operation in which the fraud-detection ECU 2100c detects a malicious frame (message) and transmits an error message. Here, respective sequences represent individual process procedures (steps) performed by the respective devices.

The ECU 400e acquires a sensor state from the corner sensor 405 (sequence S2001).

Then, the ECU 400e generates a data frame (message) having a data field which includes the acquired sensor state and whose message ID is "5" and transmits the data frame to the bus 500d (sequence S2002). The ECU 400e repeatedly performs sequences S2001 and S2002 at intervals of a certain time period (sequence S2003). The intervals of the certain time period (for example, 25 msec) allow the cycle in which the ECU 400e transmits a data frame to follow the frame rule illustrated in FIG. 21.

The fraud-detection ECU 2100c, which is connected to the bus 500d, receives the message ID of the data frame (message) transmitted from the ECU 400e (sequence S2004).

The fraud-detection ECU 2100c checks whether or not the reception cycle (that is, the transmission cycle) of the message falls within a transmission cycle range specified in the frame rule (see FIG. 21) to judge anomaly (out of the range) (sequence S2005). If the cycle is not anomalous, the fraud-detection ECU 2100c does not transmit an error message and repeatedly performs the procedure of sequences S2004 and S2005 each time a message is transmitted on the bus 500d. That is, as long as a data frame is repeatedly transmitted from the ECU 400e in the transmission cycle that follows the frame rule, in the judgment of sequence S2005, the fraud-detection ECU 2100c judges that the cycle of the message is not anomalous. While not illustrated in FIG. 26, the gateway 300a, which is connected to the bus 500d, transfers the data frame with the message ID "5", which is transmitted from the ECU 400e, to the bus 500b.

It is assumed here that a malicious ECU transmits a data frame with the message ID "5" at certain timing (sequence S2002a). The malicious ECU transmits a date frame with the same message ID as the message ID "5", which is transmitted from the ECU 400e in certain cycles, but performs the transmission at timing irrelevant to the transmission cycle of the ECU 400e.

When the malicious ECU transmits a data frame, the fraud-detection ECU 2100c receives the message ID of the data frame (sequence S2004), checks the transmission cycle on the basis of the frame rule, and judges that the cycle is anomalous (sequence S2005). Since the transmission of the data frame from the malicious ECU is irrelevant to the transmission cycle of the ECU 400e, it is sufficiently probable that the cycle will be shorter than the transmission cycle range specified in the frame rule.

If it is judged that the cycle is anomalous, the fraud-detection ECU 2100c transmits to the bus 500d an error message having a data field which includes "5", which is the message ID (sequence S2006).

Upon receipt of the error message, the gateway 300a transfers the error message to another bus (sequence S2007). As a result, it is possible for an ECU connected to the other bus to also handle the transmission of the malicious data frame whose message ID is "5". For example, the gateway 300 transfers an error message between buses, and the head unit 200 receives the error message, displays the occurrence of an error on a display or the like, and records a log regarding the error on a storage medium or the like. In addition, for example, an ECU which has received the error message stores the message ID defined in the data field of the error message, and performs predetermined processing so as to eliminate the need to use a message having the message ID, if necessary. Additionally, upon receipt of a message having this message ID later, the ECU does not process the message.

2.7 Advantageous Effects of Second Embodiment

A fraud-detection ECU illustrated in the second embodiment determines whether or not a transmitted frame is a malicious frame by using a frame rule indicating the transmission cycle of a frame. This allows a malicious frame to be detected (identified) even if the ID field in the data frame is identical to that of the authorized one. In addition, the use of a frame rule makes it possible to identify a malicious frame even if the frame is difficult to discriminate from an authorized one on the basis of the content of the frame (ID field and data field) and to reduce the influence of a playback attack (replay attack) and the like. Since a fraud-detection ECU transmits, upon detecting a malicious frame, an error message indicating the message ID of the malicious frame, other ECUs are able to handle the malicious frame in accordance with the error message. Thus, an in-vehicle network system including this fraud-detection ECU is less likely to be controlled maliciously. In addition, the use of only a fraud-detection ECU as a node for determining the presence of a malicious frame can minimize the effect on the existing in-vehicle network configuration, resulting in the amount of processing and the amount of power consumption being reduced in the entire system.

Third Embodiment

An embodiment of the present disclosure will now be described in the context of an in-vehicle network system 12 including a fraud-detection ECU that implements a fraud-detection method for detecting a malicious frame by using a frame rule updated in cooperation with a device (an external device) located outside the vehicle.

3.1 Overall Configuration of in-Vehicle Network System 12

Figure 28:
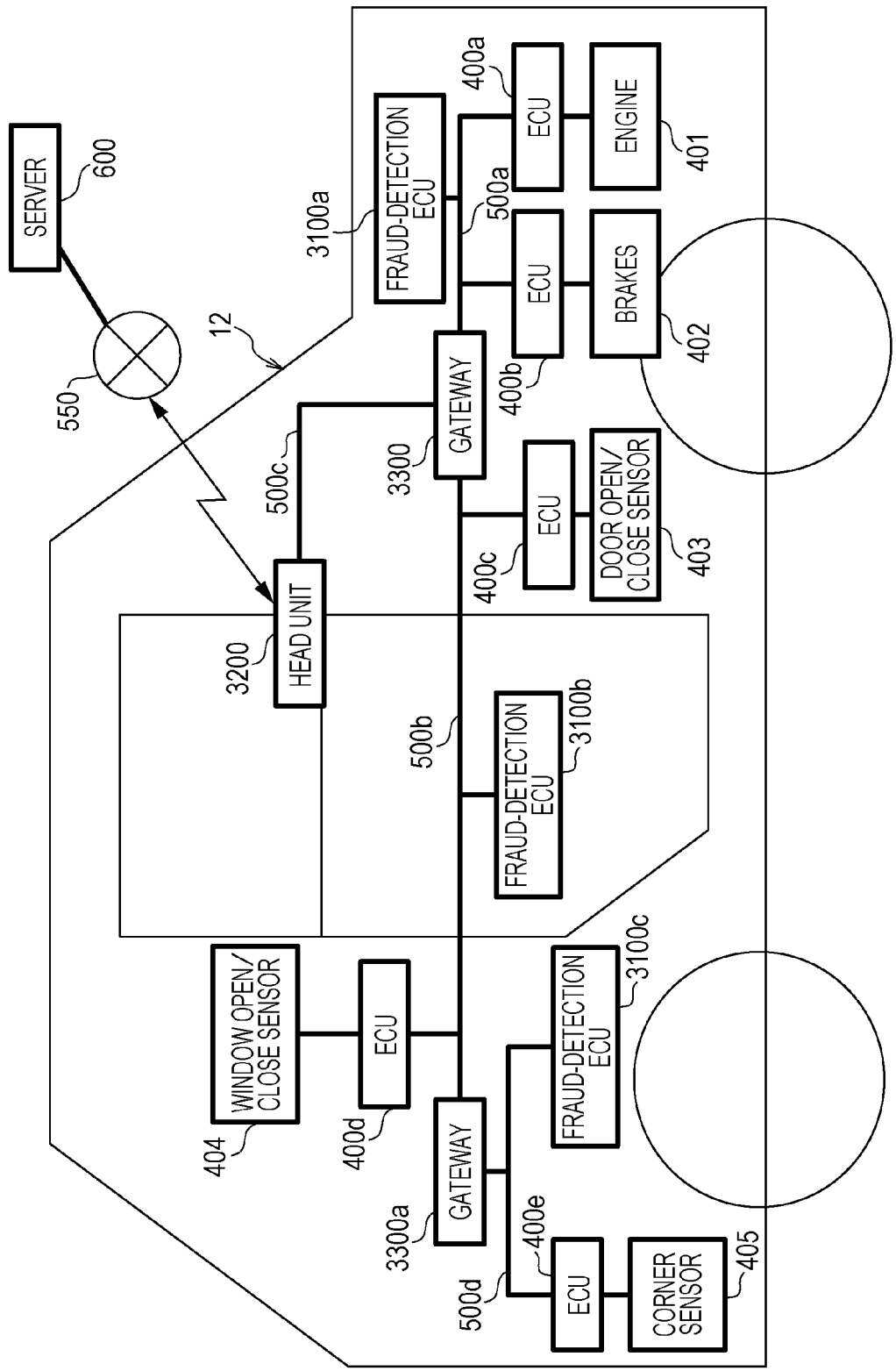
FIG. 28 is a diagram illustrating an overall configuration of an in-vehicle network system according to a third embodiment.

FIG. 28 is a diagram illustrating an overall configuration of the in-vehicle network system 12 according to a third embodiment. The in-vehicle network system 12 is obtained by modifying part of the in-vehicle network system 11 illustrated in the second embodiment.

The in-vehicle network system 12 is configured to include fraud-detection ECUs 3100a to 3100c, a head unit 3200, gateways 3300 and 3300a, and nodes connected to buses, such as ECUs 400a to 400e connected to various devices. Of the constituent elements of the in-vehicle network system 12, constituent elements having functions similar to those illustrated in the first embodiment or the second embodiment are designated by the same numerals and are not described. The head unit 3200 is obtained by partially modifying the head unit 200 illustrated in the first embodiment, and is capable of, as illustrated in FIG. 28, communicating with an external device such as a server 600 via an external network 550. The fraud-detection ECUs 3100a to 3100c are obtained by partially modifying the fraud-detection ECUs 2100a to 2100c illustrated in the second embodiment, and are connected to the buses 500a, 500b, and 500d, respectively. The gateways 3300 and 3300a are obtained by partially modifying the gateways 300 and 300a illustrated in the second embodiment.

While only a single vehicle having mounted therein the in-vehicle network system 12 is illustrated in FIG. 28, the in-vehicle network system 12 may be mounted in each of a plurality of vehicles.

The server 600 is a computer having a function of cooperating with the in-vehicle network system 12 mounted in each of one or more vehicles through communication in order to manage the in-vehicle network system(s) 12. The server 800 has a function of collecting information concerning the transmission of a malicious frame detected by the in-vehicle network system(s) 12, a function of transmitting updated rule information for updating a frame rule used in the in-vehicle network system(s) 12, and so forth. The updated rule information is input by, for example, an operator of the server 600, and the transmission of the updated rule information from the server 600 is performed at, for example, the timing specified by the operator. The updated rule information is information for replacing a frame rule by overwriting it or information to be added to a frame rule, for example, and is information that associates the message ID of a frame with the transmission cycle of the frame, for example, as in the frame rule (see FIG. 21).

3.2 Configuration of Fraud-Detection ECU 3100c

Figure 29:
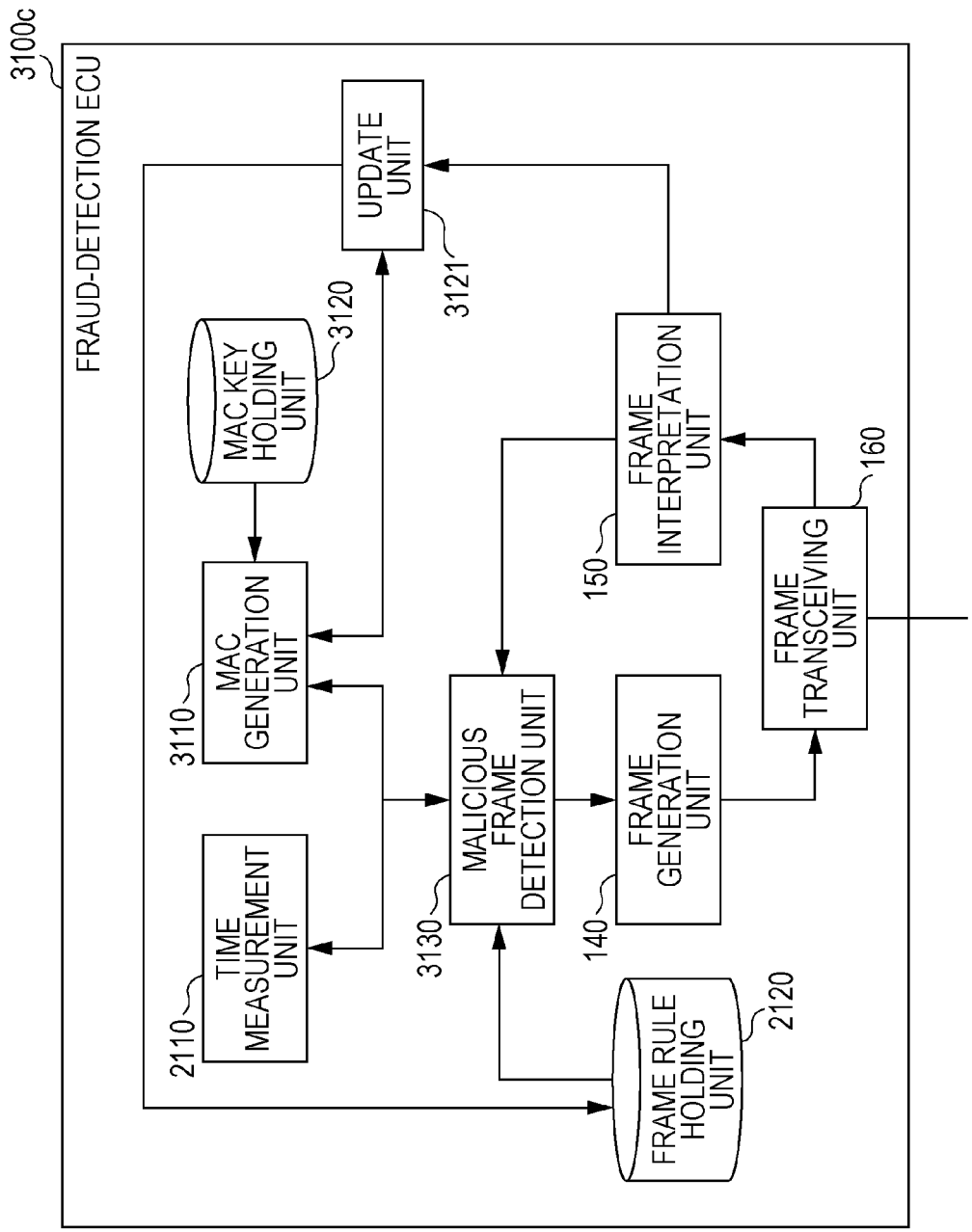
FIG. 29 is a configuration diagram of a fraud-detection ECU according to the third embodiment.

FIG. 29 is a configuration diagram of the fraud-detection ECU 3100c. The fraud-detection ECU 3100c has, in addition to the same function as that of the fraud-detection ECU 2100c illustrated in the second embodiment, a function of, when transmitting an error message, adding a message authentication code (MAC) to the error message before transmission, a function of acquiring updated rule information from the server 600 through the head unit 3200 and updating a frame rule, and so forth. In order to implement these functions, the fraud-detection ECU 3100c is configured to include a frame transceiving unit 160, a frame interpretation unit 150, a malicious frame detection unit 3130, a frame generation unit 140, a time measurement unit 2110, a frame rule holding unit 2120, a MAC key holding unit 3120, a MAC generation unit 3110, and an update unit 3121. These constituent elements are functional ones, and each of their functions is implemented by an element in the fraud-detection ECU 3100c, such as a communication circuit, a processor that executes a control program stored in a memory, or a digital circuit. Of the constituent elements of the fraud-detection ECU 3100c, constituent elements having functions similar to those of the fraud-detection ECU 2100c illustrated in the second embodiment are designated by the same numerals and are not described.

The MAC generation unit 3110 has a function of generating a MAC by using a MAC key held in the MAC key holding unit 3120 on the basis of a request made by the malicious frame detection unit 3130. Examples of the MAC generation method include HMAC (Hash-based Message Authentication Code) (see RFC 2104 HMAC: Keyed-Hashing for Message Authentication Keyed-Hashing for Message Authentication). For example, the first 4 bytes obtained as a result of computation with a value obtained by padding the message ID of a malicious frame reported by the malicious frame detection unit 3130 to a predetermined block (for example, 4 bytes) by using an HMAC with the use of a MAC key is used as a MAC.

The MAC key holding unit 3120 holds a MAC key necessary to generate a MAC. A MAC key that is identical to the MAC key held in the MAC key holding unit 3120 is also held in the head unit 3200.

The malicious frame detection unit 3130 is obtained by modifying part of the malicious frame detection unit 2130 illustrated in the second embodiment. The malicious frame detection unit 3130 has a function of receiving the message ID of a frame received from the frame interpretation unit 150 and determining whether or not the frame is a maliciously transmitted frame. That is, upon receipt of a message ID from the frame interpretation unit 150, the malicious frame detection unit 3130 notifies the time measurement unit 2110 of the message ID. Upon acquisition of a measurement time from the time measurement unit 2110, the malicious frame detection unit 3130 refers to the frame rule held in the frame rule holding unit 2120 and verifies whether the measurement time complies with the frame rule. If the measurement time is out of the transmission cycle range specified in the frame rule (a range acceptable as a rule), the malicious frame detection unit 3130 judges that a malicious frame has been transmitted. Note that if a transmission cycle has not been measured because of no previous reception (for example, if the time having a zero value has been acquired from the time measurement unit 2110), exceptionally the malicious frame detection unit 3130 does not judge that a malicious frame has been transmitted. Upon judging that a malicious frame has been transmitted, the malicious frame detection unit 3130 reports the message ID of the malicious frame and requests the MAC generation unit 3110 to generate a MAC based on the message ID. Then, the malicious frame detection unit 3130 receives the MAC generated by the MAC generation unit 3110, and requests the frame generation unit 140 to transmit an error message for which the message ID of the malicious frame and the corresponding MAC are included in the data field of the data frame. Upon receipt of the request to transmit an error message, the frame generation unit 140 generates an error message and transmits the error message via the frame transceiving unit 160. Note that the malicious frame detection unit 3130 may be configured to cause the time measurement unit 2110 to perform time measurement of a frame judged to be malicious, except for the reception timing of the frame. This allows, even after the detection of fraud, the previous, authorized frame to be used as a reference to continue to correctly judge whether or not the transmission cycle of a later received frame is appropriate.

FIG. 30 is a diagram illustrating an example of the configuration of an error message generated by the frame generation unit 140 of the fraud-detection ECU 3100c. As illustrated byway of example in this figure, the error message is a data frame having an ID field configured with the ID value "2046 (0x7FE)", which is determined in advance for an error message, and a data field which includes the message ID of a frame detected to be malicious and a MAC generated in accordance with the message ID.

The MAC generation unit 3110 described above also has a function of generating a MAC by using a MAC key held in the MAC key holding unit 3120 on the basis of a request made by the update unit 3121.

The update unit 3121 has a function of extracting updated rule information from a date frame (referred to as "updated data frame") including the updated rule information and updating the frame rule held in the frame rule holding unit 2120 by using the updated rule information. The updated rule information is received by the head unit 3200 from the server 600. Note that the head unit 3200 transmits an updated data frame having a data field whose content is the updated rule information and a MAC obtained as a result of computation by using, for example, an HMAC in response to the updated rule information, and the fraud-detection ECU 3100*c* receives this data frame via the gateways 3300 and 3300*a*. The updated data frame has an ID value which is defined in advance as "2045 (0x7FD)", for example. When the frame transceiving unit 160 receives the data frame including the updated rule information and the MAC, the update unit 3121 receives the updated rule information and the MAC from the frame interpretation unit 150, and verifies the MAC. That is, the update unit 3121 reports the updated rule information to the MAC generation unit 3110 to request the MAC generation unit 3110 to generate a MAC, and Judges whether or not a generated MAC matches the MAC received from the frame interpretation unit 150 to verify the MAC in the updated rule information. If the MACs match and the verification is successful, the update unit 3121 updates the frame rule by using the updated rule information in accordance with a predetermined procedure. Examples of the procedure include a procedure of overwriting the frame rule with the updated rule information to produce a new frame rule, and a procedure of adding the updated rule information to the frame rule. The head unit 3200 may divide the updated rule information into a plurality of updated data frames and transmit the plurality of updated data frames, and the receiver may combine and use pieces of updated rule information extracted from the plurality of updated data frames.

The fraud-detection ECUs 3100*a* and 3100*b* also have a configuration similar to that of the fraud-detection ECU 3100*c*. A frame rule held in the frame rule holding unit 2120 of each fraud-detection ECU includes the content corresponding to a frame transmittable on a bus to which the corresponding fraud-detection ECU is connected. Each fraud-detection ECU may hold a general frame rule defining transmission cycles of individual frames transmittable on any bus within the in-vehicle network system 12.

3.3 Configuration of Head Unit 3200

The head unit 3200 has, in addition to the same function as that of the head unit 200 illustrated in the first embodiment, a function of acquiring updated rule information from the server 600 and transmitting an updated data frame including the updated rule information to which a MAC is added, a function of receiving an error message and transmitting information including the message ID of a malicious frame indicated by the error message to the server 600, and so forth. In order to implement these functions, the head unit 3200 includes constituent elements illustrated in FIG. 31.

Figure 31:
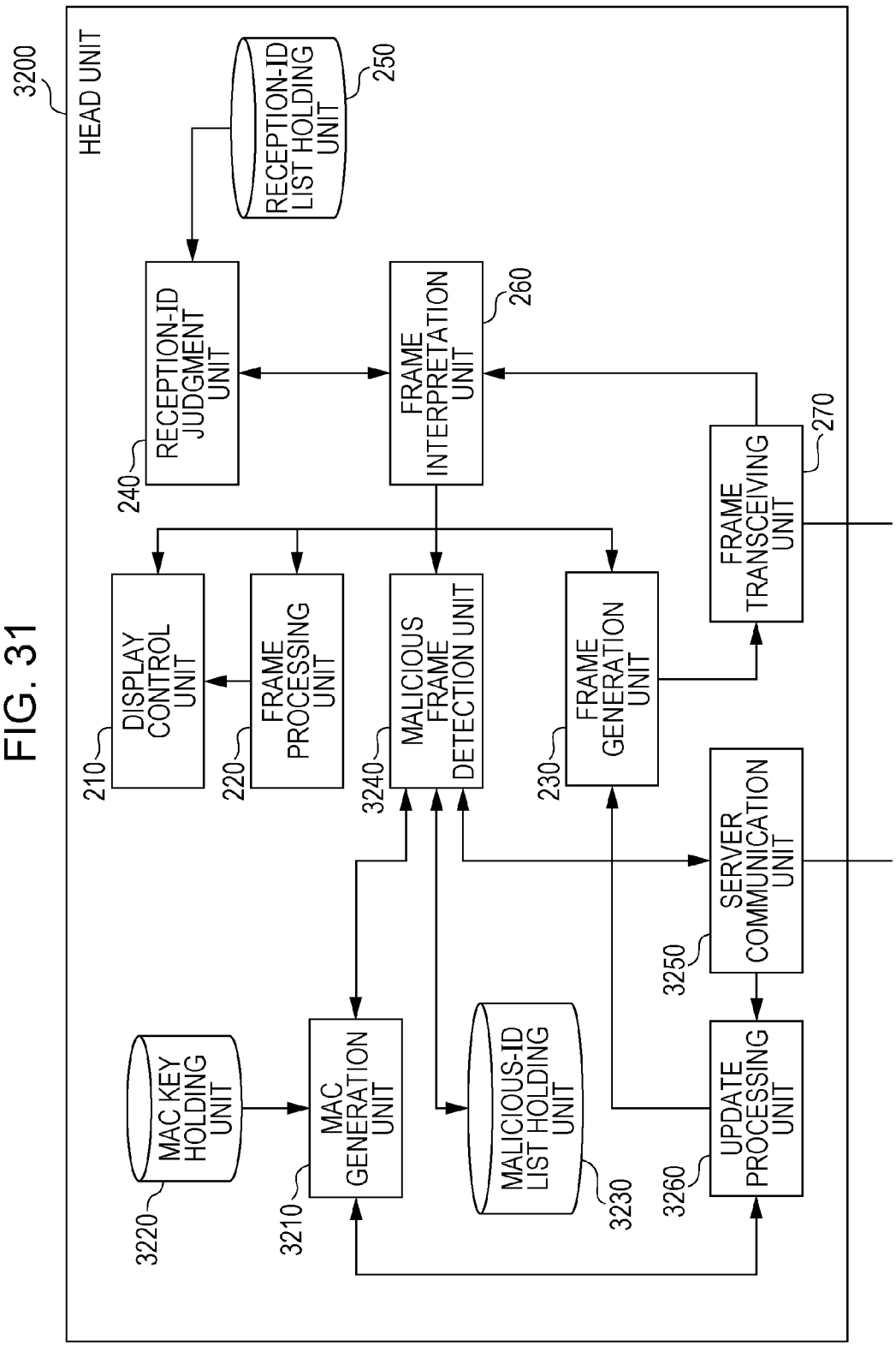
FIG. 31 is a configuration diagram of a head unit according to the third embodiment.

FIG. 31 is a configuration diagram of the head unit 3200. The head unit 3200 is configured to include a display control unit 210, a frame processing unit 220, a frame generation unit 230, a reception-ID judgment unit 240, a reception-ID list holding unit 250, a frame interpretation unit 260, a frame transceiving unit 270, a MAC generation unit 3210, a MAC key holding unit 3220, a malicious-ID list holding unit 3230, a malicious frame detection unit 3240, a server communication unit 3250, and an update processing unit 3260. These constituent elements are functional ones, and each of their functions is implemented by an element in the head unit 3200, such as a communication circuit, a processor that executes a control program stored in a memory, or a digital circuit. Of the constituent elements of the head unit 3200, constituent elements having functions similar to those of the head unit 200 illustrated in the first embodiment are designated by the same numerals and are not described appropriately.

The reception-ID list holding unit 250 holds a reception-ID list that is a list of message ID received by the head unit 3200. FIG. 32 is a diagram illustrating an example of a reception-ID list in the head unit 3200. As illustrated in the figure, the reception-ID list includes the ID value "2046 (0x7FE)" of an error message transmitted from a fraud-detection ECU.

The frame interpretation unit 260 receives the values of the frame from the frame transceiving unit 270, and interprets the values so as to map the values into the respective fields in a frame format specified in the CAN protocol. The frame interpretation unit 260 transfers a value judged to correspond to the ID field to the reception-ID judgment unit 240. In accordance with a determination result sent from the reception-ID judgment unit 240, the frame interpretation unit 260 determines whether to transfer the value in the ID field and the data field that appears after the ID field to the frame processing unit 220 or to the malicious frame detection unit 3240 or to abort reception of the frame after the determination results has been received. If the value in the ID field is "2046" (if an error message is received), the frame interpretation unit 260 transfers the value in the ID field and the data field to the malicious frame detection unit 3240.

The MAC generation unit 3210 generates a MAC by using a MAC key held in the MAC key holding unit 3220 on the basis of a request made by the malicious frame detection unit 3240. The scheme for the generation of a MAC is the same as that for the MAC generation unit 3110 in the fraud-detection ECU 3100*c* or the like. For example, the MAC generation unit 3210 uses, as a MAC, the first 4 bytes obtained as a result of computation with a value obtained by padding the message ID of a malicious frame reported by the malicious frame detection unit 3240 to a predetermined block by using an HMAC with the use of a MAC key.

The MAC key holding unit 3220 holds a MAC key necessary to generate a MAC. As described above, a MAC key that is identical to the MAC key held in the MAC key holding unit 3220 is also held in the fraud-detection ECU 3100*c* and the like. The MAC keys held in the respective fraud-detection ECUs in the in-vehicle network system 12 may be all the same or may be individually different in a case where the MAC keys held in the respective fraud-detection ECUs are individually different, the MAC key holding unit 3220 of the head unit 3200 holds all the MAC keys that are individually different.

The malicious-ID list holding unit 3230 has a function of, upon receipt of notification of the message ID of a malicious frame from the malicious frame detection unit 3240, recording the message ID on a storage medium such as a memory to hold the message ID.

Upon receipt of the message ID and the values in the data field of an error message from the frame interpretation unit 260, the malicious frame detection unit 3240 reports the message ID in the data field and requests the MAC generation unit 3210 to generate a MAC in order to verify the authenticity of the error message. Upon receipt of a MAC from the MAC generation unit 3210, the malicious frame detection unit 3240 compares the value of the MAC with that of the MAC in the data field. A match of both MACs indicates that the verification of the authenticity of the error message is successful. If the verification is successful, the malicious frame detection unit 3240 causes the malicious-ID list holding unit 3230 to hold the message ID in the data field of the error message (that is, the message ID of the malicious frame). If the verification of the authenticity of the error message is successful, furthermore, the malicious frame detection unit 3240 requests the display control unit 210 to display a warning indicating the occurrence of an error. Upon receipt of the request to display a warning, the display control unit 210 displays a warning (for example, a character string, an image, or the like indicating the occurrence of an error) on a display. In addition, the malicious frame detection unit 3240 transmits information indicating the message ID of the malicious frame to the server 600 via the server communication unit 3250.

The server communication unit 3250 has a function of communicating with the server 600 via the external network 550.

The MAC generation unit 3210 described above also has a function of generating a MAC by using a MAC key held in the MAC key holding unit 3220 on the basis of a request made by the update processing unit 3260. The scheme for the generation of a MAC is also the same as that for the MAC generation unit 3110 in the fraud-detection ECU 3100c or the like. For example, the MAC generation unit 3210 uses, as a MAC, the first 4 bytes obtained as a result of computation with a value obtained by padding part (for example, the first 2 bytes, etc.) of the updated rule information reported by the update processing unit 3260 to a predetermined block by using an HMAC with the use of a MAC key.

The update processing unit 3260 has a function of, upon receipt of updated rule information from the server 600 through the server communication unit 3250, reporting the updated rule information and causes the MAC generation unit 3210 to generate a MAC and causing the frame generation unit 230 to generate and transmit an updated data frame having a data field whose content is the updated rule information and the MAC.

3.4 Example Transfer Rules for Gateway 3300a

The gateway 3300a has a configuration similar to that of the gateway 300 illustrated in the first embodiment (see FIG. 6). However, a reception-ID list held in the reception-ID list holding unit 340 of the gateway 3300a and the transfer rules held in the transfer rule holding unit 370 of the gateway 3300a have content corresponding to the buses 500b and 500d to which the gateway 3300a is connected.

FIG. 33 is a diagram illustrating an example of transfer rules possessed by the gateway 3300a. The illustrated example indicates that a frame received from the bus 500b is set to be transferred to the bus 500d regardless of the message ID. Accordingly, for example, an updated data frame including updated rule information transmitted from the head unit 3200 is transferred from the bus 500b to the bus 500d through the gateway 3300a, and is transmitted to the fraud-detection ECU 3100c. The example in FIG. 33 also indicates that, among the frames received from the bus 500d, only a frame whose message ID is "5" and a frame (error message) whose message ID is "2046" are set to be transferred to the bus 500b.

While the gateway 3300 has a configuration similar to that of the gateway 3300a, the reception-ID list and the transfer rules have content corresponding to the buses 500a to 500c to which the gateway 3300 is connected. Similarly to the gateway 3300a, upon receipt of an updated data frame including updated rule information transmitted from the head unit 3200 from the bus 500c, the gateway 3300 also transfers the updated data frame to other buses, and transfers an error message received from the bus 500b or the bus 500a to the bus 500c. This allows a data frame including updated rule information to be transmitted from the head unit 3200 to each fraud-detection ECU within the in-vehicle network system 12 and allows an error message to be transmitted from each fraud-detection ECU to the head unit 3200.

3.5 Sequence for Detecting and Taking Measures Against Malicious Frame

A description will now be given of the operation of the fraud-detection ECU 3100c, the gateways 3300 and 3300a, the head unit 3200, and so forth when a malicious ECU is connected to the bus 500d in the in-vehicle network system 12.

Figure 34:
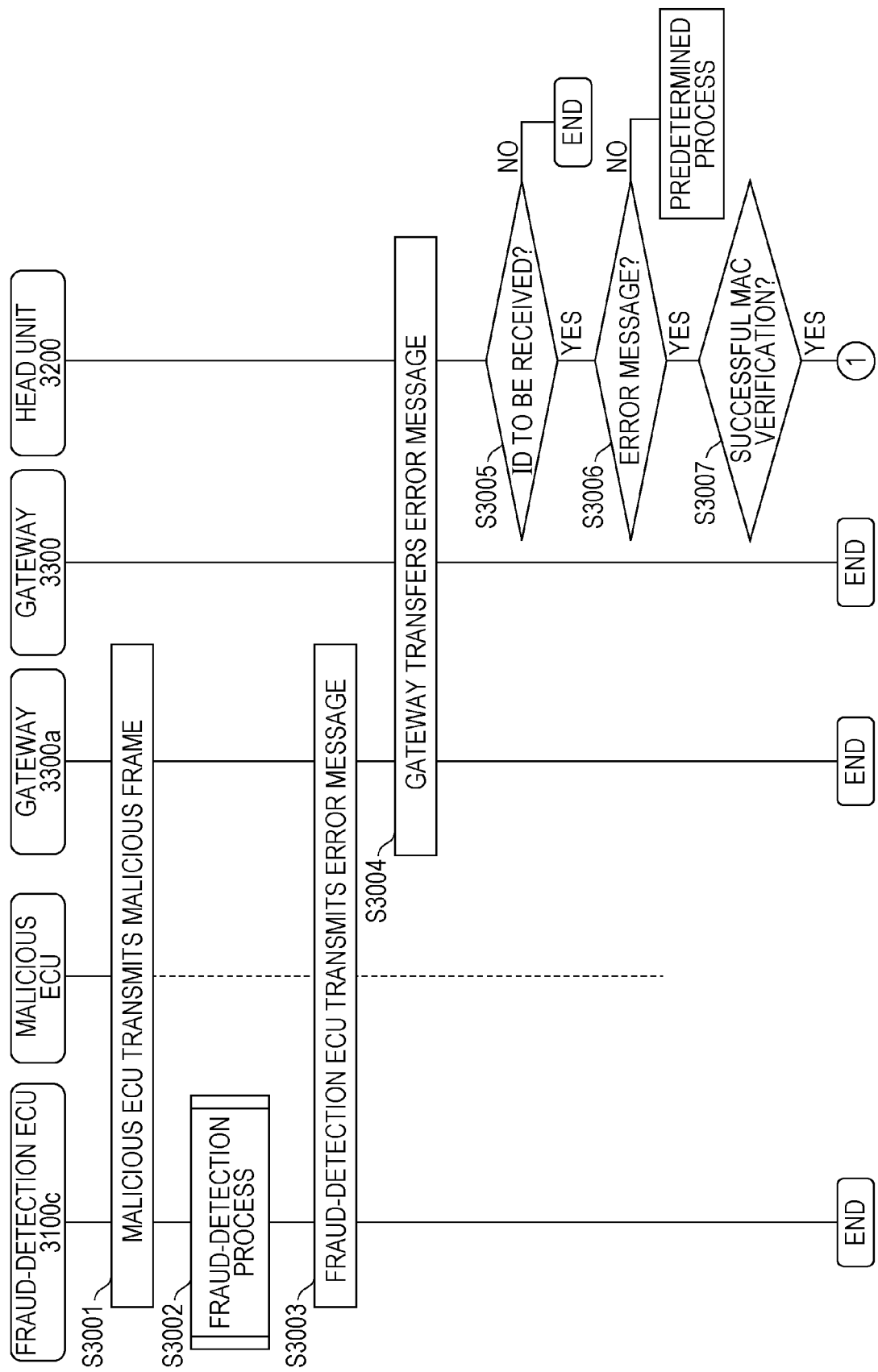
FIG. 34 is a sequence diagram illustrating an example operation for detecting a malicious frame, transmitting an error message, and displaying a warning in the third embodiment (continued in FIG. 35)
Figure 35:
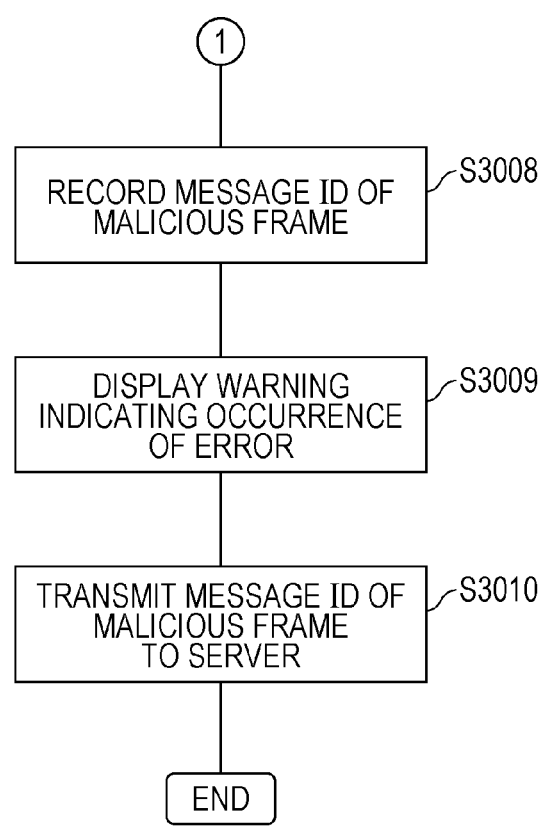
FIG. 35 is a sequence diagram illustrating the example operation for detecting a malicious frame, transmitting an error message, and displaying a warning in the third embodiment (continued from in FIG. 34)

FIG. 34 and FIG. 35 are a sequence diagram illustrating an example operation in which the fraud-detection ECU 3100c detects a malicious frame (message) and transmits an error message and the head unit 3200 takes measures such as displaying a warning. Here, respective sequences represent individual process procedures (steps) performed by the respective devices.

A malicious ECU transmits a data frame with the message ID "5" at certain timing (sequence S3001). Here, as in sequence S2002a described in the second embodiment (see FIG. 26), the malicious ECU transmits a data frame with the same message ID as the message ID "5", which is transmitted from the ECU 400e in certain cycles, but performs the transmission at timing irrelevant to the transmission cycle of the ECU 400e.

When the malicious ECU transmits a data frame, the fraud-detection ECU 3100c, which is connected to the bus 500d, performs a fraud-detection process (sequence S3002). This fraud-detection process is similar to that in sequences S2004 and S2005 described in the second embodiment, and thus is not described here. Through the fraud-detection process, the fraud-detection ECU 3100c detects that a malicious frame whose message ID is "5" has been transmitted, on the basis of an anomalous transmission cycle.

Upon detecting that a malicious frame has been transmitted, the fraud-detection ECU 3100c generates a MAC corresponding to the message ID "5" and transmits an error message having a data field which includes the message ID, namely, "5", and the MAC (sequence S3003).

Upon receipt of the error message from the bus 500d, the gateway 3300a transfers the error message to the bus 500b (sequence S3004). In addition, the error message transferred to the bus 500b is further transferred to the bus 500c by the gateway 3300. As a result, the head unit 3200, which is connected to the bus 500c, can receive the error message.

The head unit 3200 receives the error message transmitted to the bus 500c, and checks whether or not the error message has a message ID to be received on the basis of the reception-ID list (sequence S3005). If the message ID of the error message is not a message ID to be received, the head unit 3200 terminates the process. Since the message ID of the error message is a message ID to be received, the head unit 3200 then checks whether or not an error message has been received, by using the message ID (sequence S3006). If an error message has not been received, the head unit 3200 performs a process determined in advance for the message ID. In this example, the message ID of the error message has been received. Thus, the head unit 3200 receives the data field and generates a MAC on the basis of the content thereof, namely, the message ID of the malicious frame, and compares the MAC with the MAC that is the content of the data field to verify the MAC (sequence S3007). If the generated MAC and the MAC that is the content of the data field match, the verification is successful.

Only when the verification of the MAC is successful, the head unit 3200 holds the message ID of the malicious frame in the malicious-ID list holding unit 3230 and records the message ID in a log (sequence S3008). The head unit 3200 further displays a warning indicating the occurrence of an error on the display (sequence S3009). In addition, the head unit 3200 transmits information indicating the message ID of the malicious frame to the server 600 via the external network 550 (sequence S3010). This allows the server 600 to acquire information indicating that a malicious ECU that transmits a malicious frame whose message ID is "5" has been connected to the in-vehicle network system 12. For example, the server 600 is capable of collecting information concerning the transmission of malicious frames from in-vehicle networks respectively mounted in a plurality of vehicles and utilizing the information for analysis, decision on measures, and so forth. The timing at which the head unit 3200 transmits information to the server 600 may not necessarily be synchronous with the timing at which the head unit 3200 receives an error message. For example, the head unit 3200 may transmit information indicating the message ID of the malicious frame, which is held in the malicious-ID list holding unit 3230, to the server 600 at any timing.

3.6 Sequence for Processing Updated Rule Information

A description will now be given of the operation of the head unit 3200, the gateways 3300 and 3300a, the fraud-detection ECU 3100c, and so forth when the head unit 3200 receives updated rule information from the server 600.

Figure 36:
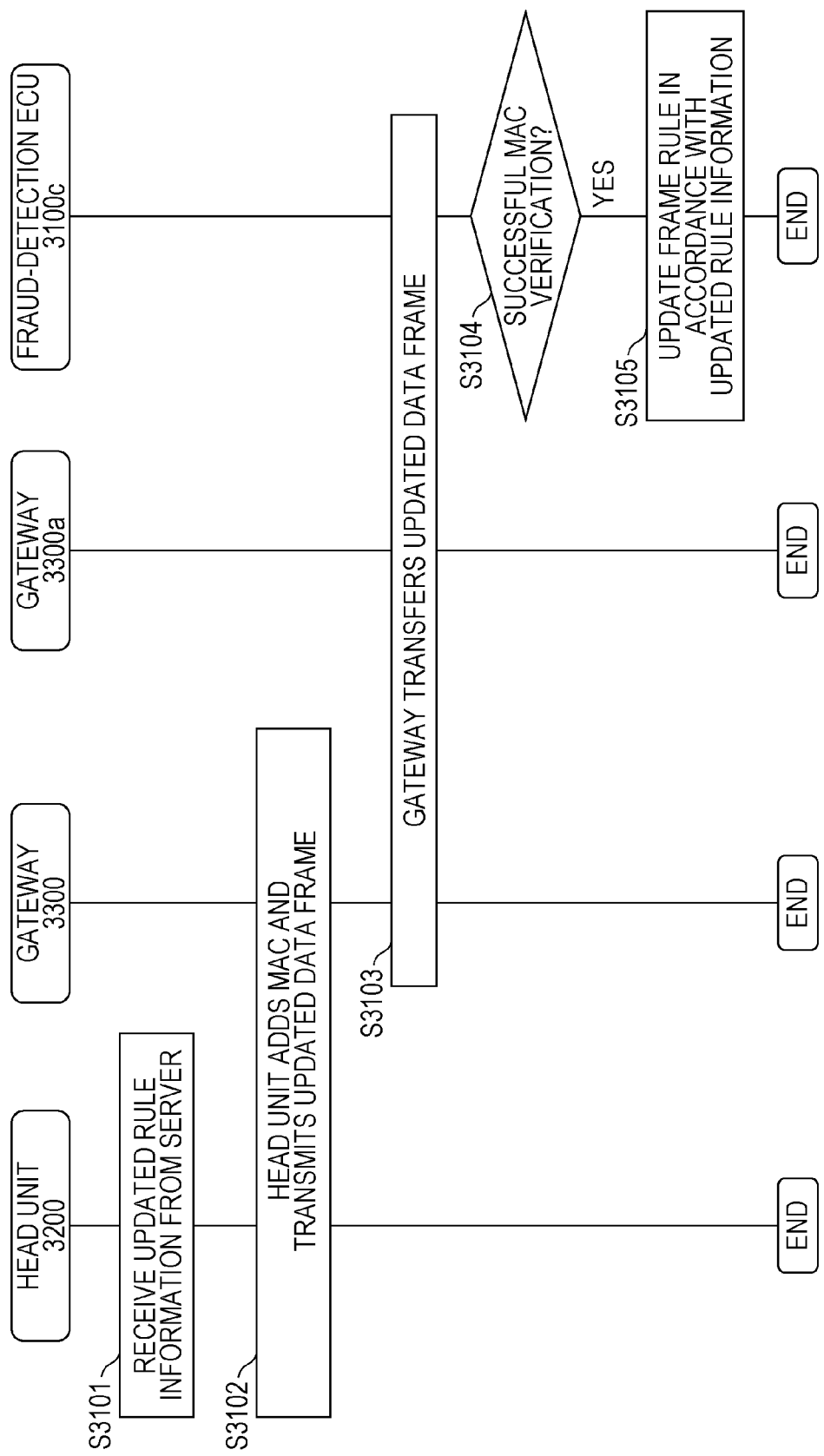
FIG. 36 is a sequence diagram illustrating an example operation for transmitting updated rule information and updating a frame rule in the third embodiment.

FIG. 36 is a sequence diagram illustrating an example operation in which the head unit 3200 transmits updated rule information and the fraud-detection ECU 3100c updates a frame rule in accordance with the updated rule information. Here, respective sequences represent individual process procedures (steps) performed by the respective devices.

The head unit 3200 receives updated rule information from the server 600 (sequence S3101).

Then, the head unit 3200 generates a MAC on the basis of the received updated rule information, and transmits an updated data frame having a data field which includes the updated rule information and the MAC to the bus 500c (sequence S3102).

Upon receipt of the updated data frame from the bus 500c, the gateway 3300 transfers the updated data frame to the bus 500b (sequence S3103). The updated data frame transferred to the bus 500b is further transferred to the bus 500d by the gateway 3300a. As a result, the fraud-detection ECU 3100c, which is connected to the bus 500d, can receive the updated data frame.

The fraud-detection ECU 3100c receives the updated data frame transmitted to the bus 500d, generates a MAC on the basis of the updated rule information included in the data field of the updated data frame, and compares the generated MAC with the MAC included in the data field to verify the MAC (sequence S3104). If the generated MAC and the MAC that is the content of the data field match, the verification is successful.

Only when the verification of the MAC is successful, the fraud-detection ECU 3100c updates the frame rule held therein in accordance with the updated rule information included in the data field of the updated data frame (sequence S3105). After that, the fraud-detection ECU 3100c detects a malicious frame on the basis of the updated frame rule.

Since an updated data frame is transferred to each bus by a corresponding gateway, fraud-detection ECUs other than the fraud-detection ECU 3100c can also update the frame rules held therein in accordance with the received updated rule information in a manner similar to that for the fraud-detection ECU 3100c.

3.7 Advantageous Effects of Third Embodiment

A fraud-detection ECU illustrated in the third embodiment determines whether or not a transmitted frame is a malicious frame by using a frame rule indicating the transmission cycle of a frame. This allows a malicious frame to be detected (identified) even if the ID field in the data frame is identical to that of the authorized one.

In addition, upon detecting a malicious frame, a fraud-detection ECU notifies a head unit of an error message including the message ID of the malicious frame. This allows the head unit to notify an external entity of an anomalous incident that has occurred in an in-vehicle network by displaying a warning on a display or by transmitting information indicating the message ID of the malicious frame to a server, for example. The server is able to receive notification of an anomalous incident from an individual in-vehicle network system mounted in each vehicle, which makes it possible to, for example, carry out appropriate measures against anomalous incidents and to achieve improvement in the safety of in-vehicle network systems.

In addition, when notifying a head unit of an error message including the message ID of a malicious frame, a fraud-detection ECU performs verification by using a MAC. This allows the authenticity of the error message to be checked, and can prevent erroneous judgment caused by a malicious error message.

In addition, the use of only a fraud-detection ECU as a node for determining the presence of a malicious frame can minimize the effect on the existing in-vehicle network configuration, resulting in the amount of processing and the amount of power consumption being reduced in the entire system.

In addition, a server is able to manage a frame rule for detecting whether or not a malicious frame is present, and the server transmits updated rule information, allowing a fraud-detection ECU in an in-vehicle network to detect a malicious frame by using a frame rule updated by using the updated rule information.

Other Embodiments

As described above, the first to third embodiments have been described as illustrative examples of the technique according to the present disclosure. However, the technique according to the present disclosure is not limited to these embodiments and is also applicable to embodiments in which modifications, replacements, additions, omissions, and others are made as desired. For example, the following modifications are also included in embodiments of the present disclosure.

(1) While the embodiments described above provide an example in which a frame is periodically transmitted from each ECU, the frame may be transmitted as an event that provides notification of a state change. For example, each ECU may transmit a frame only when the open or closed state for the door is changed, rather than periodically transmitting the open or closed state for the door. Alternatively, each ECU may periodically transmit a frame and also transmit a frame when a state change occurs.

(2) In the embodiments described above, a data frame in the CAN protocol is configured in the standard ID format. The data frame may be in an extended ID format. In the extended ID format, an ID (message ID) is expressed in 29 bits in which the base ID at the ID position in the standard ID format and an ID extension are combined. This 29-bit ID may be handled as an ID (message ID) in the embodiments described above.

(3) In the second embodiment described above, a frame rule represents, but is not limited to, a cycle in which a repeatedly transmitted message is transmitted. A frame rule may represent a rule regarding the transmission interval, such as how often a frame is transmitted (the number of transmissions per unit time, etc.). A frame that does not follow this rule is handled as a malicious frame. Specifically, the number of times a frame having an identical message ID has been transmitted within a certain time period may be counted, and it may be determined whether or not the counted value complies with the frame rule to judge whether or not the frame is anomalous (a malicious frame). For example, if the measured number of times exceeds the number of transmissions within a certain time period which is specified in the frame rule (the number of transmissions acceptable as a rule), it may be judged that a malicious frame has been transmitted. The frame rule may include a rule for the continuity of values of the data frames in a plurality of frames, for example. An example of the rule for continuity is a rule in which, for example, the value of the data field is not changed by an amount greater than or equal to a predetermined value for each transmission, for example, 1, 2, and 3. According to this rule, when a frame whose value in the data field is 2 is received after a frame whose value in the data field is 1, it is judged that this frame is an authorized frame, whereas, when a frame whose value in the data field is 100 is received after a frame whose value in the data field is 2, it is judged that this frame is a malicious frame.

(4) A fraud-detection ECU illustrated in the second and third embodiments described above may be configured not to perform detection of a malicious frame based on a frame rule in a stationary condition (such as before the start of the engine of the vehicle or during parking). In addition, when the detection of a malicious frame based on a frame rule is stopped and then restarted, the time measurement unit described above can regard the notification of the initial message ID after the restart as the initial notification described above and take the special measures described above.

(5) In the second embodiment described above, each fraud-detection ECU or ECU which has received an error message transmitted by a fraud-detection ECU in response to the detection of a malicious frame may deliver the error frame to a bus the next time a frame having an ID that is identical to the message ID of the malicious frame included in the error message is received. A fraud-detection ECU that has detected a malicious frame may also deliver an error frame to a bus the next time a message ID that is identical to the ID of this frame is received. These error frames can prevent the execution of a subsequent frame having the same content as that of a frame previously judged to be malicious.

(6) In the embodiments described above, a fraud-detection ECU judges fraud of a frame by using a frame rule. Alternatively, a predetermined specific ECU (for example, a head unit) may judge whether or not a frame is malicious. In this case, the specific ECU includes the frame rule holding unit 2120. A fraud-detection ECU notifies (transmits to) the specific ECU of, for a frame for which specific ECU is requested to judge the presence of fraud, the measurement result of the transmission cycle or the measurement result of the number of transmissions per predetermined unit time and the message ID of the frame. The specific ECU judges, based on the measurement result sent from the fraud-detection ECU, whether or not a frame (message) identified by the sent message ID is malicious, by using the frame rule in the frame rule holding unit 2120. If it is judged that the frame is malicious, the specific ECU may transmit an error message or may display a warning, if the specific ECU is a head unit, or transmit information indicating the ID of the malicious frame to the server 600. Only when a fraud-detection ECU receives a message ID not included in a frame rule including a rule for the transmission interval for each message ID or the like, which is held in the frame rule holding unit 2120, the fraud-detection ECU may notify a specific ECU (for example, a head unit) of the measurement result of the transmission cycle or the measurement result of the number of transmissions and request the specific ECU to judge whether or not fraud is present.

(7) In the third embodiment described above, a head unit adds a MAC to updated rule information stored in an updated data frame. A MAC may not necessarily be added to the updated rule information. However, the addition of a MAC allows the transmission of a malicious updated data frame to be handled.

(8) In the third embodiment described above, a head unit has a configuration for communicating with a server that is an external device. Alternatively, an ECU other than the head unit (such as a gateway or a fraud-detection ECU) may have a configuration for communicating with a server. That is, a head unit, a gateway, a fraud-detection ECU, or the like may function as a so-called external communication electronic control unit (that is, an ECU capable of communicating with an external device). In a case where a fraud-detection ECU has a configuration for communicating with a server, upon detecting a malicious frame, the fraud-detection ECU may transmit information indicating the message ID of the frame directly to the server, and may receive updated rule information directly from the server and update the frame rule held therein in accordance with the updated rule information.

(9) the third embodiment described above provides an example in which a gateway uniformly transfers an updated data frame including updated rule information from one bus to another bus. However, if the updated rule information is a set of rules for transmission intervals for a frame having one or more specific message IDs, it is sufficient that the updated rule information reach a fraud-detection ECU connected to a bus along which the specific message ID or IDs flow. Accordingly, upon receipt of an updated data frame, a gateway may select a transfer destination bus in accordance with the message ID to which the rule is applied and transfer the updated data frame only to the selected bus. Alternatively, a head unit may limit and designate a fraud-detection ECU to which the updated data frame is transmitted (for example, designate the fraud-detection ECU by entering destination information in the data field). In this case, the gateway may transfer the updated data frame only to a bus coupled to the fraud-detection ECU that is the designated destination. Note that a single updated data frame may include updated rule information related to a rule for a frame having a single message ID or may include updated rule information related to a rule for frames having a plurality of message IDs.

(10) In the third embodiment described above, HMAC is used as a MAC calculation algorithm. Alternatively, CBC-MAC (Cipher Block Chaining Message Authentication Code) or CMAC (Cipher-based MAC) may be used. In addition, padding used in MAC computation may be any type of padding in which the data size of a block is necessary for computation, such as zero padding or that in ISO 10126, PKCS#1, PKCS#5, or PKCS#7. Furthermore, also in the method of changing the size to that of a block such as 4 bytes, padding may be provided either at the beginning, end, or in the middle. Furthermore, data used for MAC calculation may not necessarily be data that is consecutive (for example, continuous data of 4 bytes), but may be a composite one configured through bit-by-bit collection in accordance with a specific rule. In addition, the size of the MAC is not limited to 4 bytes and may be, for example, 2 bytes or the like.

(11) The CAN protocol illustrated in the embodiments described above may have a broad meaning including its derivative protocols, such as TTCAN (Time-Tiggered CAN) and CAN FD (CAN with Flexible Data Rate).

(12) The individual ECUs (including a gateway and a head unit) in the embodiments described above are each assumed to be a device including, for example, digital circuits such as a processor and a memory, analog circuits, a communication circuit, and so forth, but may include other hardware components such as a hard disk drive, a display, a keyboard, and a mouse. In addition, instead of a control program stored in a memory being executed by a processor to implement functions in software, the functions may be implemented by dedicated hardware (such as a digital circuit).

(13) Some or all of the constituent elements included in each device in the embodiments described above may be constituted by a single system LSI (Large Scale Integration). The system LSI is a super-multifunctional LSI manufactured by integrating a plurality of configuration units on one chip, and is specifically a computer system configured to include a microprocessor, a ROM, a RAM, and so forth. The RAM has recorded thereon a computer program. The microprocessor operates in accordance with the computer program, thereby allowing the system LSI to achieve its function. In addition, constituent units included in each of the devices described above may be integrated into individual chips or into a single chip that includes some or all of the units. While the system LSI is used here, an integrated circuit may also be referred to as an IC, an LSI, a super LSI, or an ultra LSI depending on the difference in the degree of integration. In addition, a technique for forming an integrated circuit is not limited to the LSI, and may be implemented by using a dedicated circuit or a general-purpose processor. An FPGA (Field Programmable Gate Array) that can be programmed after the manufacture of the LSI or a reconfigurable processor capable of reconfiguring connection or setting of circuit cells in the LSI may be used. Additionally, if a technique for forming an integrated circuit is introduced in place of the LSI along with development in semiconductor technology or other derivative technology, it is a matter of course that the technique may be used for the integration of functional blocks. One potential approach is to apply biotechnology, for example.

(14) Some or all of the constituent elements included in each of the devices described above may be constituted by an IC card removably set in each device or a stand-alone module. The IC card or the module is a computer system constituted by a microprocessor, a ROM, a RAM, and so forth. The IC card or the module may include the super-multifunctional LSI described above. The microprocessor operates in accordance with a computer program, thereby allowing the IC card or the module to achieve its function. This IC card or module may be tamper-resistant.

(15) An aspect of the present disclosure may provide a method such as the fraud-detection method or anti-fraud method described above. An aspect of the present disclosure may also provide a computer program for implementing these methods by using a computer, or a digital signal including the computer program. In an aspect of the present disclosure, furthermore, the computer program or the digital signal may be recorded on a computer-readable recording medium such as a flexible disk, a hard disk, a CD-ROM, an MO, a DVD, a DVD-ROM, a DVD-RAM, a BD (Blu-ray (registered trademark) Disc), or a semiconductor memory. An aspect of the present disclosure may also provide the digital signal recorded on such recording media. In an aspect of the present disclosure, furthermore, the computer program or the digital signal may be transmitted via a telecommunication line, a wireless or wired communication line, a network represented by the Internet, data broadcasting, or the like. A further aspect of the present disclosure may provide a computer system including a microprocessor and a memory, in which the memory has recorded thereon the computer program described above and the microprocessor operates in accordance with the computer program. Moreover, the program or the digital signal may be recorded on the recording medium and transported, or the program or the digital signal may be transported via the network or the like, so as to be performed by any other independent computer system.

(16) Embodiments achieved by any combination of constituent elements and functions illustrated in the embodiments described above and the modifications described above also fall within the scope of the present disclosure.

The present disclosure is applicable for use in efficient suppression of the influence of a malicious ECU in an in-vehicle network system.

What is claimed is:

1. A fraud-detection method for use in an in-vehicle network system, the in-vehicle network system including a plurality of electronic controllers that exchange messages through communication via a plurality of networks, a plurality of fraud-detection electronic controllers, each connected to a different one of the plurality of networks, and a gateway device, the fraud-detection method comprising:
   determining, by one of the plurality of fraud-detection electronic controllers, whether or not a message transmitted on a network connected to the one of the plurality of fraud-detection electronic controllers is malicious by using rule information indicating a rule regarding transmission of the message on the network, wherein the rule is stored in a memory included in the one of the plurality of fraud-detection electronic controllers;
   receiving, by the gateway device, updated rule information transmitted to a first network included in the plurality of networks;
   selecting, by the gateway device, a second network from among the plurality of networks, except for the first network, as a transfer destination network to which an updated rule indicated by the updated rule information is to be applied;
   transferring, by the gateway device, the updated rule information only to the second network; and
   acquiring, by a fraud-detection electronic controller connected to the second network among the plurality of fraud-detection electronic controllers, the updated rule information transferred by the gateway device and updating, by the fraud-detection electronic controller connected to the second network, the rule information stored in a memory by using the updated rule information.

2. The fraud-detection method according to claim 1, wherein
   the plurality of electronic controllers perform communication via the plurality of networks in accordance with a Controller Area Network protocol.

3. The fraud-detection method according to claim 1, wherein
the in-vehicle network system further includes an external communication electronic controller, and
the updated rule information is received by the gateway device in response to a receipt of the updated rule information by the external communication electronic controller from an external device, the updated rule information being transmitted on the first network by the external communication electronic controller.

4. The fraud-detection method according to claim 3, wherein
the external communication electronic controller generates a message authentication code for the updated rule information and transmits the updated rule information with the message authentication code added to the updated rule information.

5. An in-vehicle network system, comprising:
a plurality of electronic controllers that exchange messages through communication via a plurality of networks;
a plurality of fraud-detection electronic controllers, each connected to a different one of the plurality of networks; and
a gateway device,
wherein each fraud-detection electronic controller of the plurality of fraud-detection electronic controllers includes:
a memory that stores rule information regarding transmission of at least one message on a network connected to the fraud-detection electronic controller, and
circuitry which, in operation, performs operations including:
determining whether or not a message transmitted on the network is malicious by using the rule information stored in the memory;
acquiring updated rule information transferred from the gateway device; and
updating the rule information stored in the memory by using the updated rule information, and
the gateway device includes:
one or more memories; and
circuitry which, in operation, performs operations including:
receiving the updated rule information transmitted on a first network included in the plurality of networks;
selecting a second network from among the plurality of networks, except for the first network, as a transfer destination network to which an updated rule indicated by the updated rule information is to be applied; and
transferring the updated rule information only to the second network.

6. A gateway device included in an in-vehicle network system, the in-vehicle network system including a plurality of electronic controllers that exchange messages through communication via a plurality of networks and a plurality of fraud-detection electronic controllers, each connected to a different one of the plurality of networks, the gateway device comprising:
one or more memories; and
circuitry which, in operation, performs operations including:
receiving updated rule information from a first network included in the plurality of networks;
selecting a second network from among the plurality of networks, except for the first network, as a transfer destination network to which an updated rule indicated by the updated mule information is to be applied; and
transferring the updated rule information only to the second network
wherein one of the plurality of fraud-detection electronic controllers determines whether or not a message transmitted on a network connected to the one of the plurality of fraud-detection electronic controllers is malicious by using rule information indicating a rule regarding transmission of the message on the network, the rule being stored in a memory included in the one of the plurality of fraud-detection electronic controllers,
the one of the plurality of fraud-detection electronic controllers transmits, in a case where the message is determined to be malicious, an error message including a first message identifier of the message determined to be malicious, and
a fraud-detection electronic controller connected to the second network among the plurality of fraud-detection electronic controllers acquires the updated rule information transferred by the gateway device and updates, by the fraud-detection electronic controller connected to the second network, the rule information stored in a memory by using the updated rule information.

* * * * *